United States Patent
Gandolfi et al.

(10) Patent No.: US 11,123,762 B2
(45) Date of Patent: Sep. 21, 2021

(54) METHOD FOR COATING BULK MATERIAL

(71) Applicant: I.M.A. INDUSTRIA MACCHINE AUTOMATICHE S.P.A., Ozzano dell'Emilia (IT)

(72) Inventors: Nicola Gandolfi, Ozzano dell'Emilia (IT); Jola Gorreja, Ozzano dell'Emilia (IT)

(73) Assignee: I.M.A. Industria Automatiche S.p.A.

( * ) Notice: Subject to any disclaimer, the term of this patent is extended or adjusted under 35 U.S.C. 154(b) by 0 days.

(21) Appl. No.: 16/610,234

(22) PCT Filed: May 2, 2018

(86) PCT No.: PCT/IB2018/053021
§ 371 (c)(1),
(2) Date: Nov. 1, 2019

(87) PCT Pub. No.: WO2018/203239
PCT Pub. Date: Nov. 8, 2018

(65) Prior Publication Data
US 2020/0055079 A1 Feb. 20, 2020

(30) Foreign Application Priority Data
May 3, 2017 (IT) .......................... 102017000047436

(51) Int. Cl.
*B05D 1/02* (2006.01)
*A61J 3/00* (2006.01)
*B01J 2/00* (2006.01)
*B05B 13/02* (2006.01)

(52) U.S. Cl.
CPC ................ *B05D 1/02* (2013.01); *A61J 3/005* (2013.01); *B01J 2/006* (2013.01); *B05B 13/0257* (2013.01)

(58) Field of Classification Search
None
See application file for complete search history.

(56) References Cited

U.S. PATENT DOCUMENTS 5,721,012 A * 2/1998 Long, Jr. .................. A01C 1/06
427/212
2012/0015101 A1 1/2012 O'Hara et al.
2012/0121774 A1* 5/2012 Marjeram ........... B05B 13/0257
426/302

FOREIGN PATENT DOCUMENTS

EP 1871542 B1 3/2012
WO 2012012866 A1 2/2012

* cited by examiner

Primary Examiner — Tabatha L Penny
(74) Attorney, Agent, or Firm — Laubscher & Laubscher, P.C.

(57) ABSTRACT

A method for coating bulk material uses a coating apparatus to produce a continuous flow of coated material having a predetermined stationary coating weight gain. Coating material is sprayed on the bulk material in two phases within respective first and second rotatable tubular containers of the coating apparatus. In the first rotatable container, the bulk material is partially coated with a pre-set weight gain. In the second rotatable container, the bulk material is sprayed with a coating material to obtain a bulk material coated with the predetermined stational coating weight gain. A transition phase is provided between the two spray periods during which a load of coated bulk material from the first container is transferred at a transfer flow rate to the second container while a new load of bulk material is fed to the first container at the same flow rate as the transfer flow rate.

12 Claims, 19 Drawing Sheets

METHOD FOR COATING BULK MATERIAL

CROSS-REFERENCE TO RELATED APPLICATIONS

This application is a § 371 National State entry of PCT International Application No. PCT/IB2018/053021 filed May 2, 2018. PCT/IB2018/053021 claims priority to Italian Application No, IT-102017000047436 filed May 3, 2017. The entire content of these applications is incorporated herein by reference.

FIELD OF THE INVENTION

The invention relates to a method for coating bulk material, in particular for covering material in the form of granules, pellets, tablets, pills, capsules, particles etc, with at least one layer of coating material.

Specifically, but not exclusively, the invention can be applied to coat pharmaceutical products (for example tablets) or food products, in particular to produce tablets coated with film.

BACKGROUND

It is known to form the coating of pharmaceutical tablets inside a drilled pan, with a circular or polygonal section, rotated on its longitudinal axis in order to move the mass of the tablets, inside which at least one gun is arranged that sprays the coating material.

It is also known to generate a flow of gas (treated air) that is forced from the exterior to the interior of the pan, passing through the holes and the mass of the tablets, to perform drying, heating and cooling according to process needs.

Plants are known that work in batch mode, with a product-loading step, in which the pan is filled with the desired quantity of tablets, a product coating step, and a discharge step until the pan is completely emptied.

Plants are also known that work in continuous mode, in which the product moves without interruption from a loading zone, where the product enters the pan, to a discharge zone.

In continuous mode, a stationary phase exists, in which the mass of the processed product is more or less constant (some enters the pan, some is processed, some exits) and two transition phases, a start or filling step, in which there is a transition from pan empty status to stationary production status and another switching off or emptying status, in which the opposite occurs.

Patent publication WO 2012/012866 A1 shows an apparatus for coating items like tablets, in which a rotating drum has an inlet and an outlet for the tablets and a rotating adjustable weir partially obstructs the outlet so as to maintain a bed of tablets in the drum at a set depth. WO 2012/012866 A1 provides a coating method in which a system of nozzles dispenses a coating onto the tablets in a plurality of individually controlled spraying zones arranged linearly along the drum; the nozzles are operated selectively according to two different modes: i) a batch mode for a start or stop sequence in which the system of nozzles is controlled to provide different quantities of coating in respective zones of the bed of tablets, in which the coating quantity delivered during the start sequence is chosen in such a manner that the tablets are substantially completely coated only when situated in a drum zone near the drum outlet and the coating quantity delivered during the stop sequence is selected to coat in a substantially complete manner the entire bed of tablets and ii) a continuous mode in which the tablets are introduced continuously into the inlet of the drum and are discharged from the outlet of the drum, simultaneously applying sprays in all the zones.

Patent publication EP 1871542 B1 shows an apparatus similar to that of WO 2012/012866 A1, in which a "batch" start step is provided.

Patent publication U.S. Pat. No. 5,721,012 A discloses a method for applying a coating to a bulk material, such as seeds or pharmaceutical products, in which two tubular containers are connected by a conduit and starting and stopping procedures are provided as indicated in the preamble of the claim 1.

Patent publication US 2012/015101 A1 shows a system for coating loose items such as pharmaceutical tablets, seeds or other food items, comprising a rotating drum provided at the outlet of an adjustable barrier plate for adjusting the height of the material inside the drum and thus the stationing time of the material. The method comprises a start-up protocol in which the tablets are dispensed into the drum on the basis of an initial batch. Spraying zones are sequentially activated to provide a coating fluid, starting with the area adjacent to the first end of the drum and moving sequentially towards the second end of the drum. Following the initial "batch" protocol, the system can be used in a continuous operating mode in which the drum is fed and discharged continuously. The method includes a shutdown protocol which is essentially the opposite of the start-up protocol.

One drawback of the prior art disclosed above is that the start step is rather long and complex, a certain time there being necessary so that the material contained in the zone near the drum outlet is coated with the preset coating quantity and a continuous operating step can be started.

Another of the problems of the prior art is to ensure the correct movement of the product, in particular in the transition phases, for example to ensure sufficient stay of the product in the start or filling step and/or a rapid outflow of the product in the step of switching off or emptying.

Still another problem is treating the product being processed with extreme delicacy, to avoid damage to the product or to the coating thereof, whilst maintaining high productivity in the coating process.

SUMMARY OF THE INVENTION

One object of the invention is to improve the prior art methods for coating bulk material.

One object of the invention is to provide a coating method that is able to solve one or more of the aforesaid problems of the prior art.

One advantage is enabling simple and effective regulation of the flow of the bulk material during the coating process.

One advantage is obtaining particularly gentle handling of the bulk material, both in the transition phases and in the stationary phase.

One advantage is to ensure correct handling of the product, in particular ensuring sufficient stay of the product in the start step and/or a rapid outflow of the product during the switching-off step.

One advantage is providing a method for the continuous production of bulk material, in the form of granules, pellets, tablets, pills, capsules, particles, etc.

Such objects and advantages and still others are achieved by an apparatus and/or by a method according to one or more of the claims set out below.

In one embodiment, a coating method, for coating bulk or loose material in the form of granules, pellets, tablets, pills, capsules, particles, etc, includes an initial transition phase or start procedure with batch operation and a continuous operating mode, both performed by a coating apparatus having at least two rotatable tubular containers or drums linked together by a conveying device. During the start procedure, a load of bulk material is delivered to the first rotatable tubular container and coated here, reaching a coating weight gain that is equal to that it is desired to obtain with the stationary operation; subsequently, a transition phase is started in which the load of coated bulk material is gradually transferred from the first to the second rotatable tubular container whilst the first container is supplied with an equal flow rate of bulk material to be coated. Inside the first container and the second container internal spray zones are then activated in sequence to obtain at the respective output an established weight gain.

BRIEF DESCRIPTION OF THE DRAWINGS

The invention can be better understood and implemented with reference to the attached drawings that illustrate some embodiments thereof by way of non-limiting example, in which.

DETAILED DESCRIPTION

With reference to the aforesaid figures, identical elements of different embodiments have been indicated, for the sake of greater clarity and simplicity, by the same numbering. Overall by 1 a coating apparatus has been indicated that is usable for coating bulk or loose material, in particular material in the form of granules, pellets, tablets, pills, capsules, particles, etc.

The apparatus 1 can be used, for example, to coat pharmaceutical products (for example tablets) and/or food products. The coating can comprise at least one layer of coating material such as, for example, a coating of polymer film that is suitable for coating pharmaceutical tablets. The apparatus 1 can be used, in particular, to produce tablets coated with film.

The coating apparatus 1 comprises a first container 2 that can receive and discharge bulk material M. The first container 2 can be of tubular shape, for example a circular or polygonal section. The first container 2 can rotate (around a first rotation axis X1) to promote movement of the bulk material M. The first container 2 can rotate, for example, around its own longitudinal axis.

The first container 2 can comprise a first inlet 3 and a first outlet 4 of the bulk material M. The first inlet 3 and the first outlet 4 are arranged at two opposite ends of the first container 2. The first container 2 can rotate with a first horizontal or tilted rotation axis to promote mixing of the bulk material and/or the transit of the bulk material from the first inlet 3 to the first outlet 4. The tilt of the first container 2 can be adjustable.

It is possible, as in these embodiments, for at least one part of the first container 2 to be permeable to a process gas (treated air) to process the bulk material M within the first container 2. In particular, the first container 2 can be drilled to permit the process gas to pass through, retaining the bulk material.

The coating apparatus 1 can comprise, in particular, a process gas supplying arrangement (for example of known type) configured to supply the gas through the first container 2 and thus through the bulk material M contained in the first container 2. The process gas can be suitable, in particular, for drying, heating or cooling the bulk material, or for performing any other types of treatment.

Figure 13:
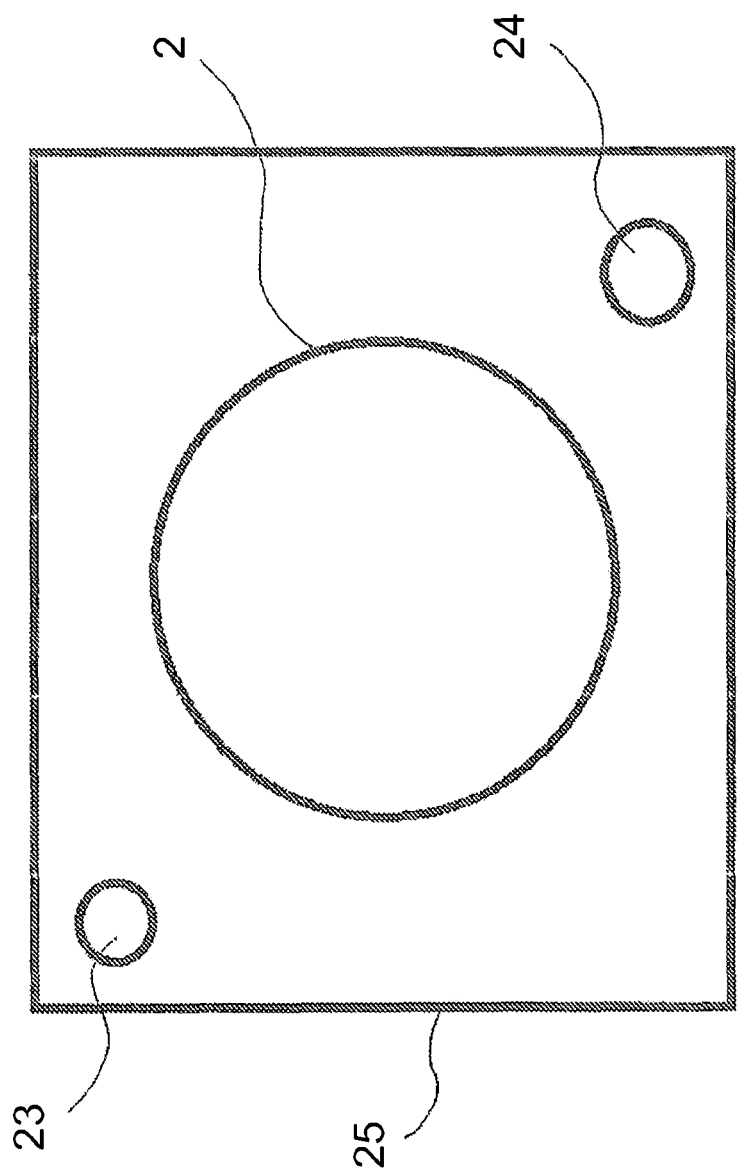
FIG. 13 is a frontal view in a vertical elevation of a third embodiment of a coating apparatus to show schematically the arrangement of the process gas inlet and outlet.

The process gas can, as in this embodiment, enter or exit the front end of the apparatus (for example on the side of the first inlet 3 or on the side of the first outlet 4). The apparatus can comprise, in particular, an air inlet 23 and an air outlet 24 situated (for example on a casing 25 that encloses the first container 2) in opposite (for example diametrically opposite) positions with respect to the rotation axis of the first container 2. In this embodiment the air inlet 23 and the air outlet 24 are arranged obliquely (in particular at 45°), i.e. an imaginary line that joins the air inlet 23 and the air outlet 24 is oblique, forming an angle (of about 45°) with a through vertical axis for the rotation axis of the first container 2. In particular, (with reference to FIG. 13) the two openings (i.e. the air inlet 23 and the air outlet 24) are arranged on the two opposite lateral sides of the first container 2, one higher up and one lower down, with a set tilt with respect to the rotation direction of the first container 2, i.e. in such a manner that the higher opening is arranged on the part of a side of the first container 2 that rotates downwards and the lower opening is arranged on the opposite side, i.e. on a side of the first container 2 that rotates upwards. In this specific embodiment, the air inlet 23 is situated at the top and the air outlet 24 is situated at the bottom. In operation, the flow of process gas (treated air) is pushed in a forced manner from the outside to the inside of the drilled first container 2 and then from the inside to the outside, passing through the holes and the mass of the tablets.

The coating apparatus 1 can comprise, as in these embodiments, a supply portion A arranged to receive the bulk material M from the outside and direct the bulk material M to the first inlet 3 of the first rotating container 2. The supply portion A (for example of known type) can be fixed and arranged contiguously to the end of the first container 2 where the first inlet 3 is situated.

The coating apparatus 1 comprises a first dispensing device 5 (for example of known type) for dispensing coating material to the bulk material M contained in the first container 2. The first dispensing device 5 can comprise, in particular, one or more nozzles arranged (aligned) inside the first container 2 to spray the coating material.

The coating apparatus 1 comprises a second container 6 arranged serially downstream of the first container 2. The second container 6 can be of tubular shape, for example a circular or polygonal section. The second container 6 can be shaped and arranged to receive the bulk material M coming from the first container 2 and to discharge the bulk material M, for example to possible subsequent processes to be performed on the material. The second container 6 can rotate (around a second rotation axis X2) to promote handling of the bulk material M in the second container 6. The second container 6 can rotate, for example, around its own longitudinal axis.

It is possible, as in this embodiment, that at least one part of the second container 6 is permeable to a process gas (treated air) to process the bulk material M within the second container 6. In particular, the second container 6 can be drilled to permit the transit of the process gas but not the transit of the bulk material M.

The coating apparatus 1 can comprise, in particular, the process gas supplying arrangement configured to supply the process gas through the second container 6 and thus through the bulk material M contained in the second container 6. The process gas can be suitable, in particular, for drying, heating or cooling the bulk material, or for performing other types of treatment.

Figure 11:
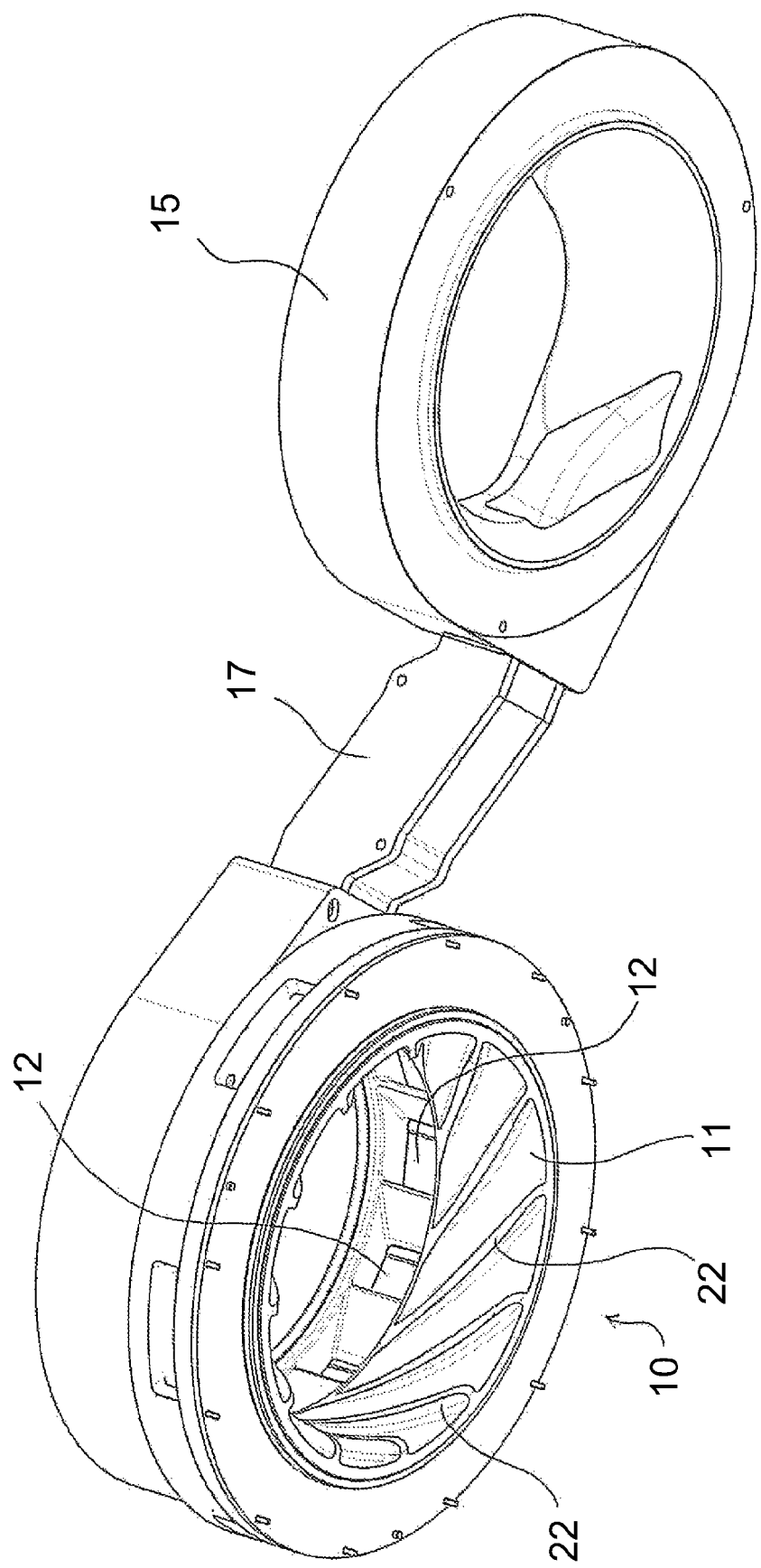
FIG. 11 is a perspective view of the zone of the apparatus in FIG. 3 in which the bulk material is transferred from the outlet of the first rotating container to the inlet of the second rotating container.
Figure 12:
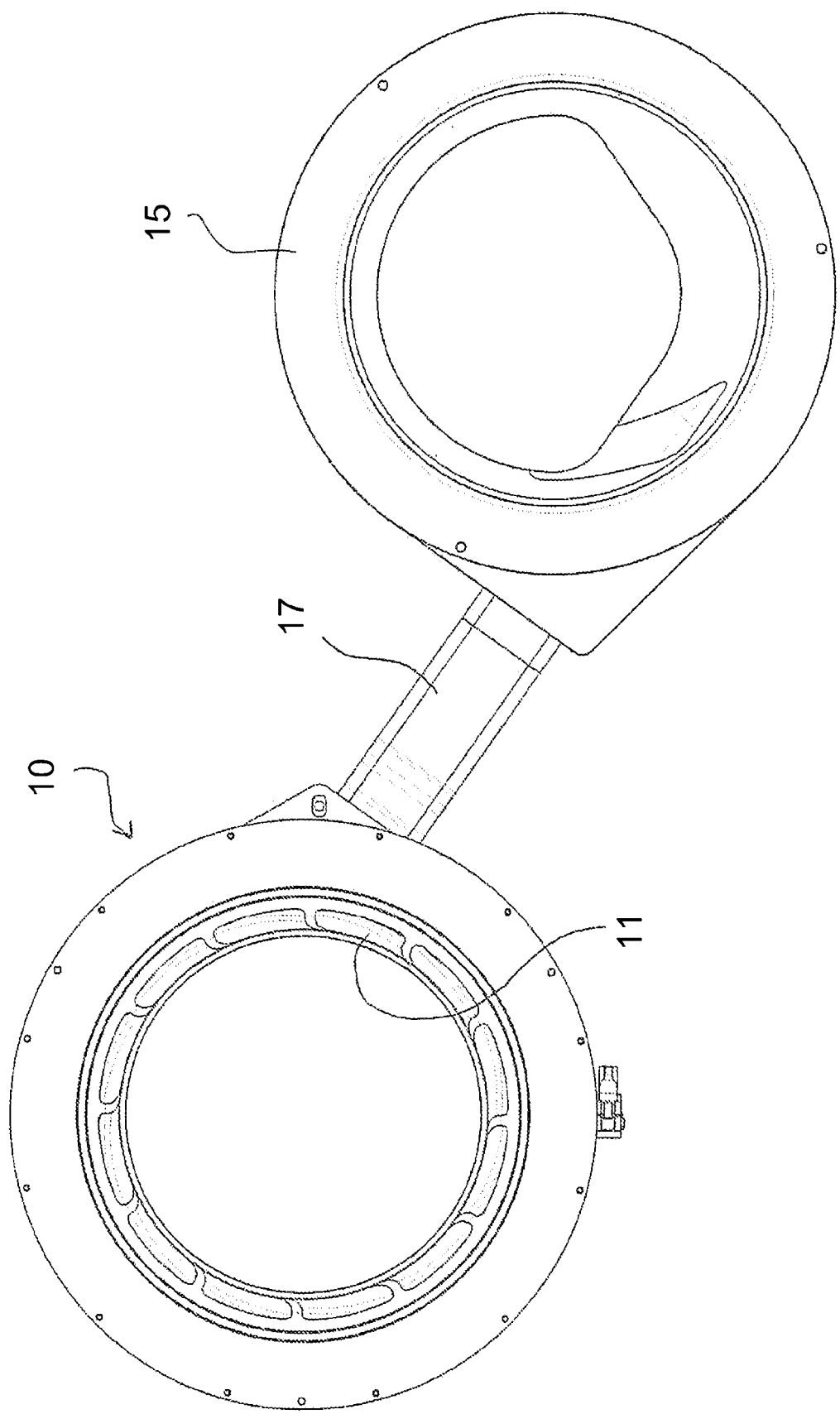
FIG. 12 is a frontal view in a vertical elevation of the zone of FIG. 11.

The second container 6 can comprise a second inlet 7 and a second outlet 8 of the bulk material M. The second inlet 7 and the second outlet 8 can be arranged at two opposite ends of the second container 6. As FIGS. 11 and 12 show, with the second container 6 a supply portion 15 (fixed, arranged coaxially to the second container 6 and contiguously to the end of the second container 6 that has the second inlet 7) can be associated that is suitable for guiding the inlet of the material. The second container 6 can rotate around a second horizontal or tilted rotation axis to promote mixing of the bulk material M and/or the transit of the bulk material M from the second inlet 7 to the second outlet 8. The tilt of the second container 6 can be adjustable.

Figure 2:
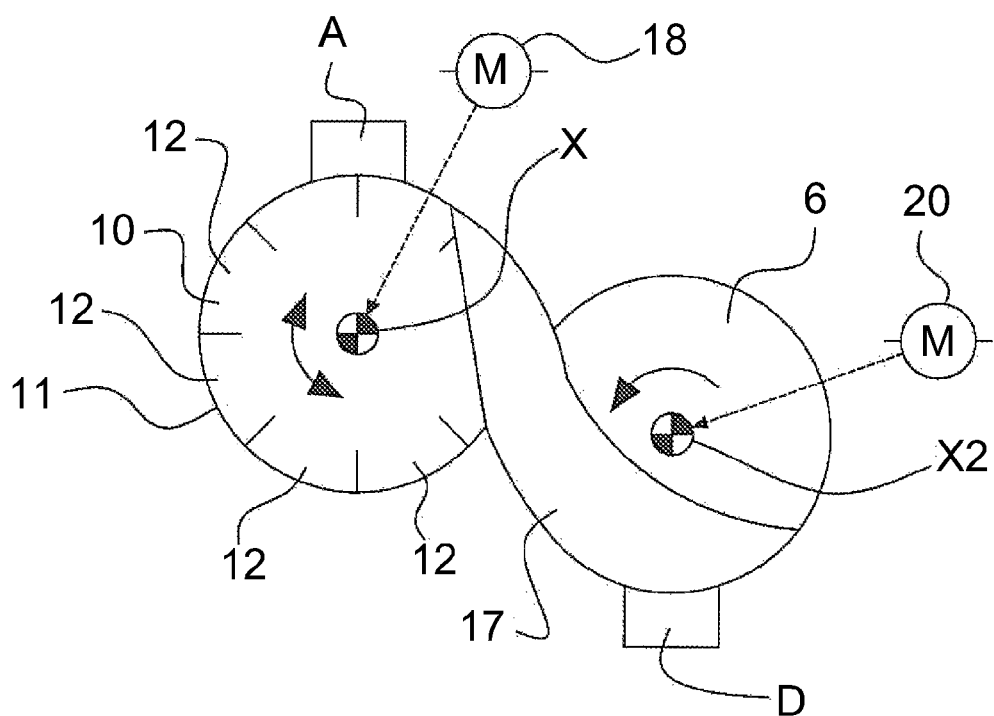
FIG. 2 is a view from the right of FIG. 1.
Figure 3:
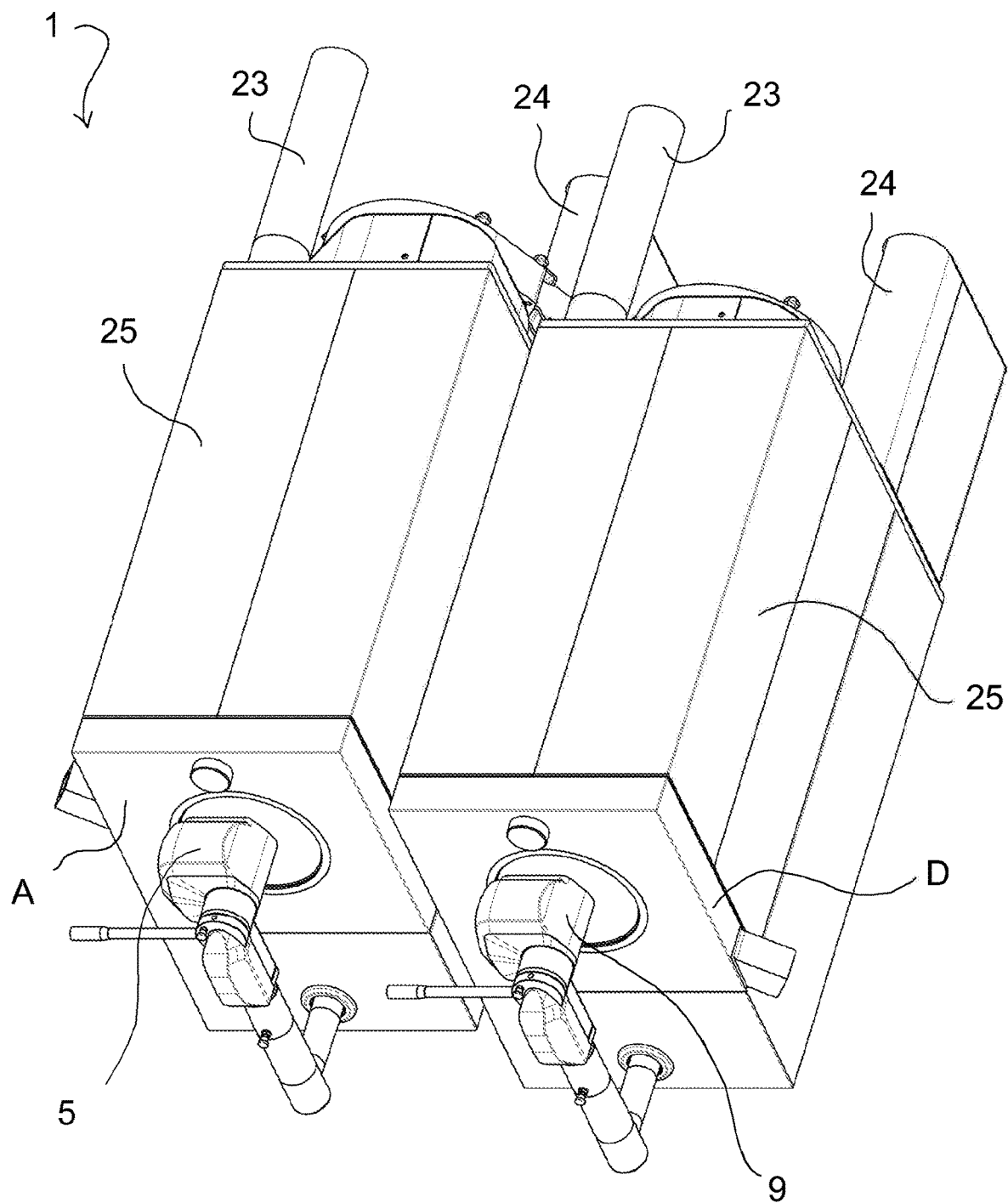
FIG. 3 is a perspective top view of a second embodiment of a coating apparatus made according to the invention.
Figure 4:
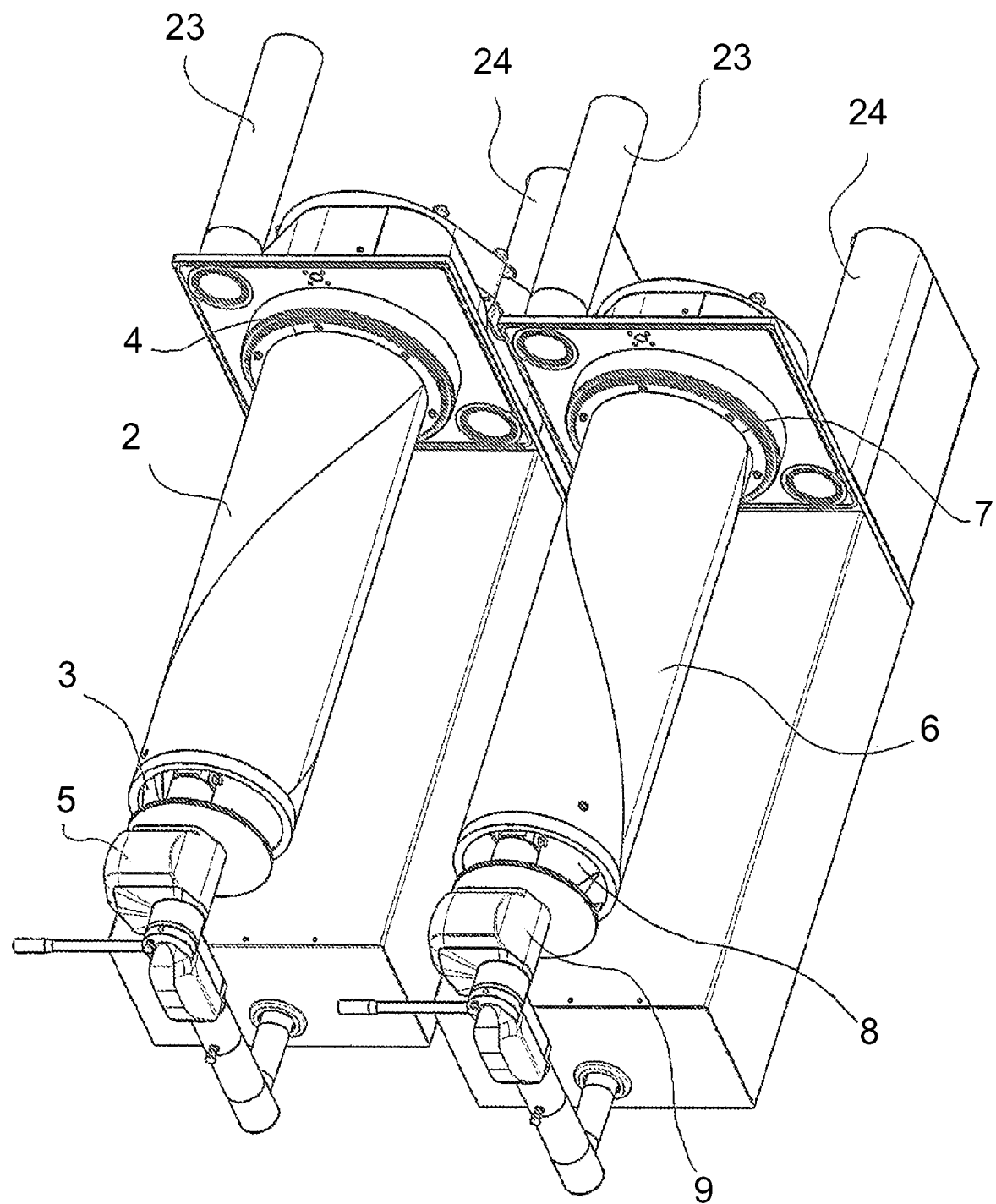
FIG. 4 is the view of the apparatus of FIG. 3 with certain parts removed to highlight other parts better.

The coating apparatus 1 can comprise, as in these embodiments, a discharge portion D (shown in FIG. 2) arranged to receive the bulk material M that exits from the second outlet 8 of the second rotating container 6 and to discharge the bulk material M to the exterior. The discharge portion D (for example of known type) can be fixed to and contiguous with the end of the second container 6 where the second outlet 8 is situated.

The coating apparatus 1 can comprise, as in this embodiment, a second dispensing device 9 (for example of known type) for dispensing coating material (that can be the same type of material dispensed by the first dispensing device 5 in the first container 2 or a material of different type) on the bulk material M contained in the second container 6. The second dispensing device 9 can comprise, in particular, one or more nozzles arranged (aligned) inside the second container 6 to spray the coating material.

The first inlet 3 of the first container 2 and of the second outlet 8 of the second container 6 (thus like the supply portion A and the discharge portion D) are arranged on the same side of the apparatus, in particular on a front side where an operator workstation is situated. In other embodiments, it is possible to load the bulk material on a behind or rear side, transfer the material to an opposite, frontal or forward side (operator side), and then discharge the material onto the behind or rear side.

In this specific embodiment, the bulk material M in transit in the first container 2 from the first inlet 3 to the first outlet 4 moves in a certain direction, whereas the bulk material M in transit in the second container 6 from the second inlet 7 to the second outlet 8 moves in a direction substantially opposite the aforesaid direction in the first container 2.

The coating apparatus 1 comprises a conveying device arranged to convey the bulk material from the first container 2 to the second container 6.

This conveying device can comprise, in particular, a conveyor 10 configured to remove at least one part of the hulk material M exiting the first container 2. The conveyor 10 can be configured, in particular, to remove the bulk material M at a certain (lower) height and then lift the bulk material M to a greater height, to then discharge the bulk material M to the second container 6. In other embodiments, another conveyor, identical to the conveyor 10, can be applied, if necessary, to the discharge of the second container 6, i.e. near the second outlet 8, to remove at least one part of the bulk material M exiting the second container 6.

The conveyor 10 can comprise, in particular, at least one rotating element 11 that rotates around a rotation axis X one or more removal portions 12, each of which is arranged to remove bulk material M from the aforesaid lower position and then lift the bulk material M to the aforesaid upper position. Each removal portion 12 is shaped so as to define a containing chamber of a quantity of bulk material M.

The rotating element 11 can rotate around a rotation axis X that is distinct and driven independently of the first rotation axis X1 around which the first container 2 rotates. The rotation axis X of the rotating element 11 can be, in particular, but not necessarily, parallel (or coaxial, as in this specific embodiment) to the first rotation axis X1 of the first container 2.

Each removal portion 12 is configured to perform, at each rotation of the rotating element 11, a removal of a quantity of bulk material M. In the specific case, the rotating element 11 can comprise a plurality of removal portions 12 that are arranged on a periphery of the rotating element 11 that are angularly spaced apart from one another.

In the embodiment disclosed here the conveyor 10 comprises at least one removal portion 12 arranged on one rotating element 11, so that the removal portion 12 is movable along a circular trajectory.

It is possible to provide other embodiments (which are not illustrated) in which the conveyor 10 comprises at least one removal portion 12 that is movable along a closed loop path, which is not necessarily singular (for example defined by a flexible conveying element, such as a belt or a chain), in which it can adopt at least a lower position, in which it removes the bulk material M from a lower position and at least one upper position, in which it discharges the bulk material M to an upper position. In other embodiments, it is possible for each removal portion 12 to be commanded to perform an open trajectory, in particular with an outward motion, in which the removal operation can be performed (only) during the outward and return motion.

The rotating element 11 can be arranged, as in this embodiment, opposite and contiguously to an end of the first container 2 from which the bulk material M exits. The rotating element 11 can comprise, as in this embodiment, a rotating cylindrical body (coaxial with the first container 2) that supports the various removal portions 12.

Each removal portion 12 can be, as in this embodiment, in the shape of a container (drawer, socket, spoon, etc) configured to contain a quantity of bulk material M. Each removal portion 12 can comprise at least one (movable) wall 13, for example in the form of a blade, that bounds at least in part the containing chamber of the bulk material M.

The rotating element 11 can rotate around the rotation axis X selectively in a first rotation direction and in a second rotation direction that is opposite the first.

The movable wall 13 can be tilted so as to remove the bulk material M from the aforesaid lower position when the rotating element 11 rotates in a first rotation direction (that is the same as the rotation direction of the first container 2 around the first rotation axis X1).

Figure 5:
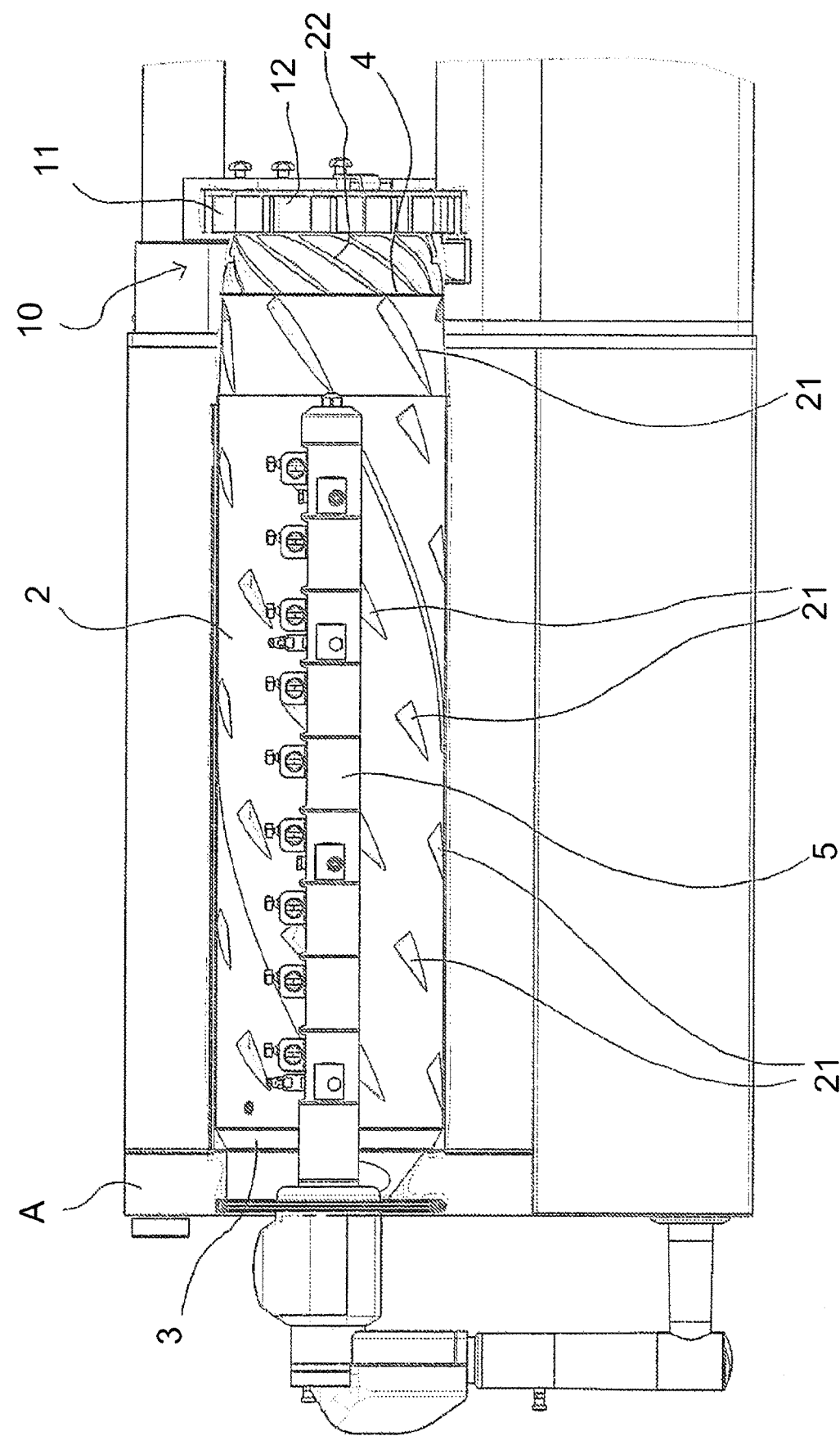
FIG. 5 is a section on a vertical plane of the first rotating container of the apparatus of FIG. 3.
Figure 6:
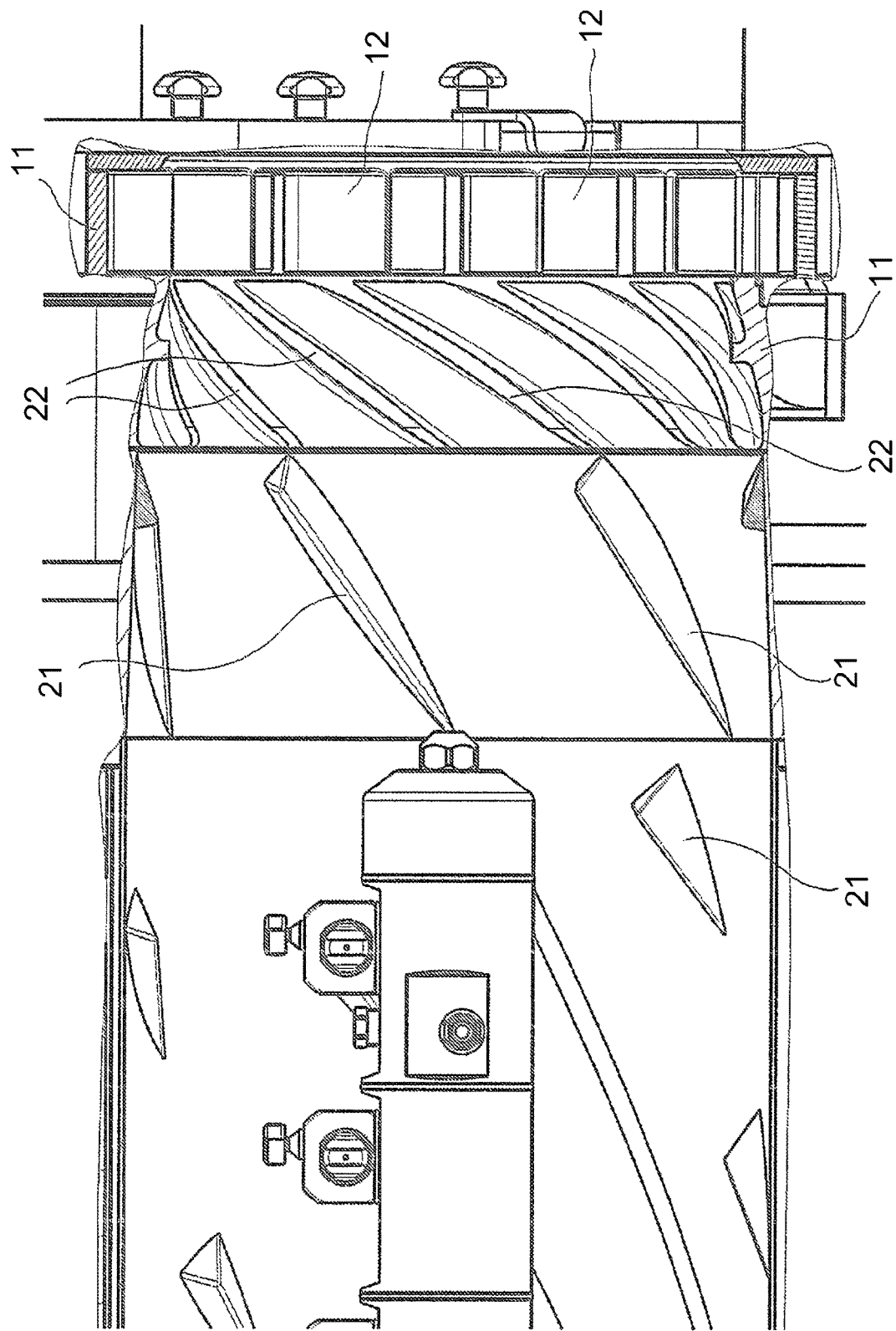
FIG. 6 shows an enlarged detail of FIG. 5.
Figure 7:
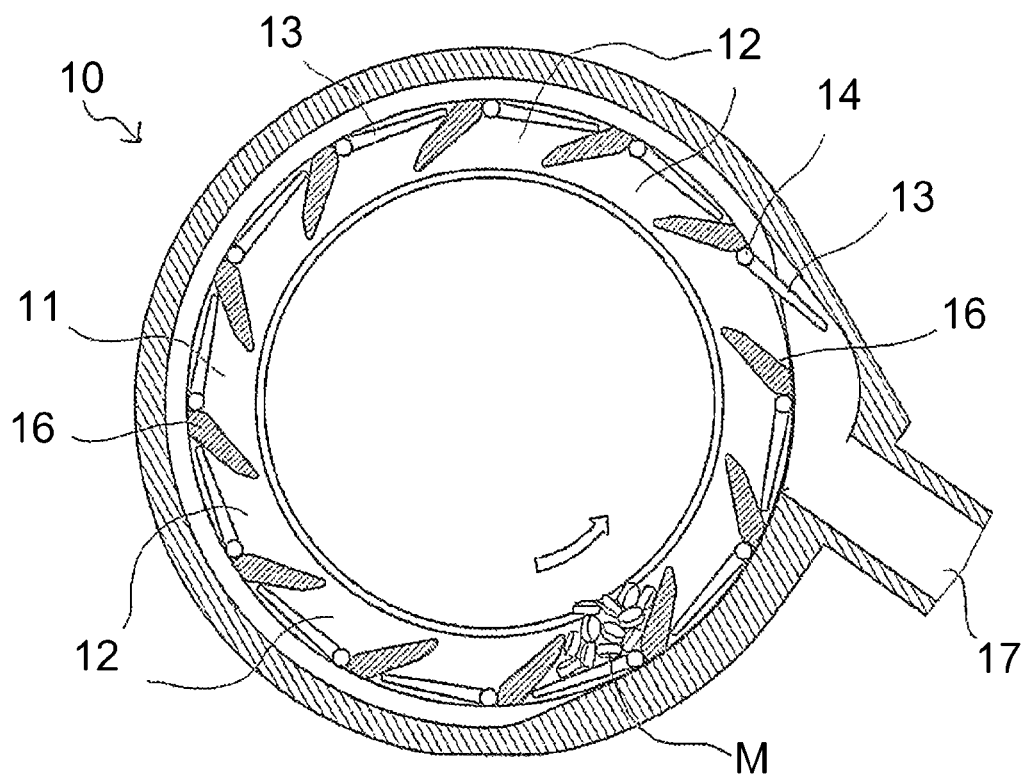
FIGS. 7 to 10 are frontal views in a vertical elevation of some operating steps of a removed portion of the apparatus in FIG. 3 from the bulk material removal step to the bulk material discharging step.
Figure 8:
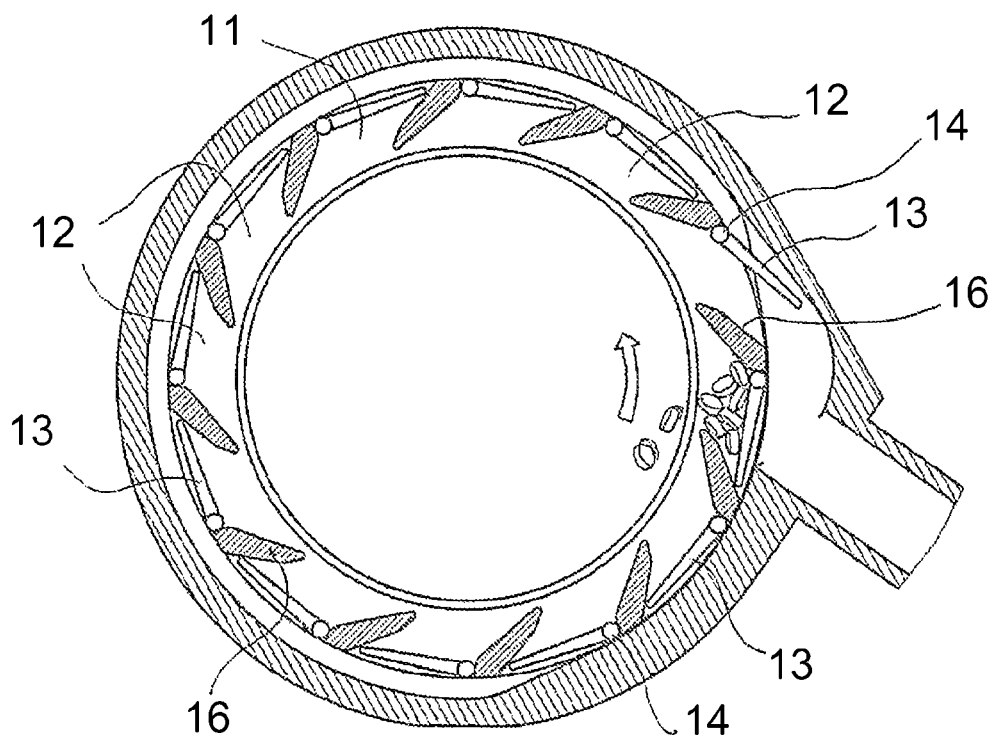
Figure 9:
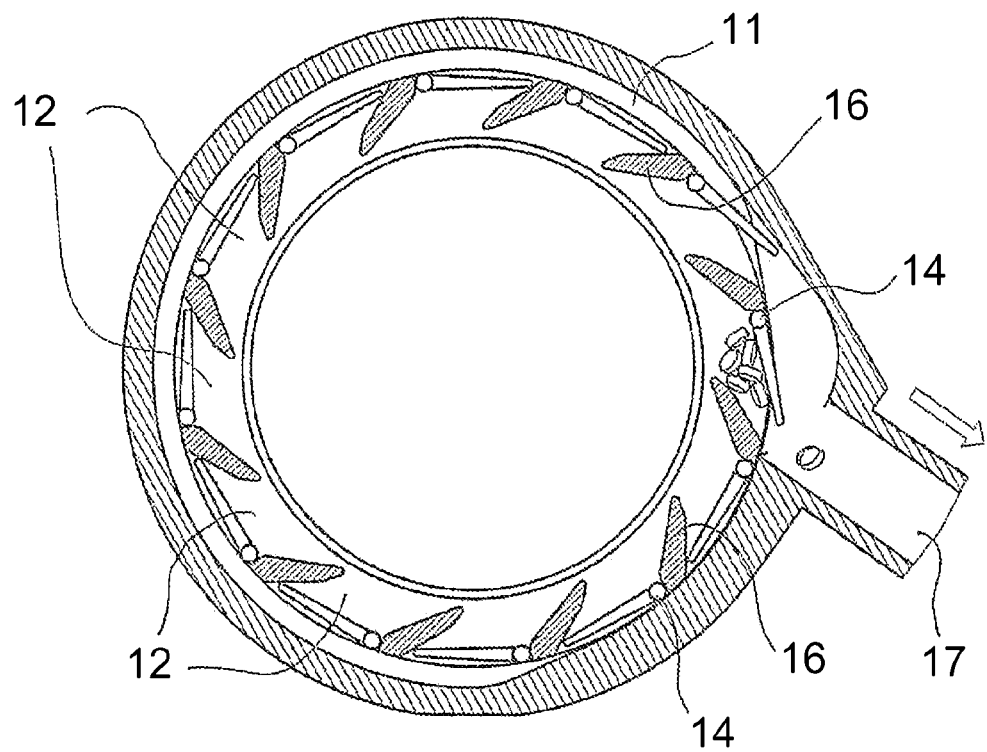
Figure 10:
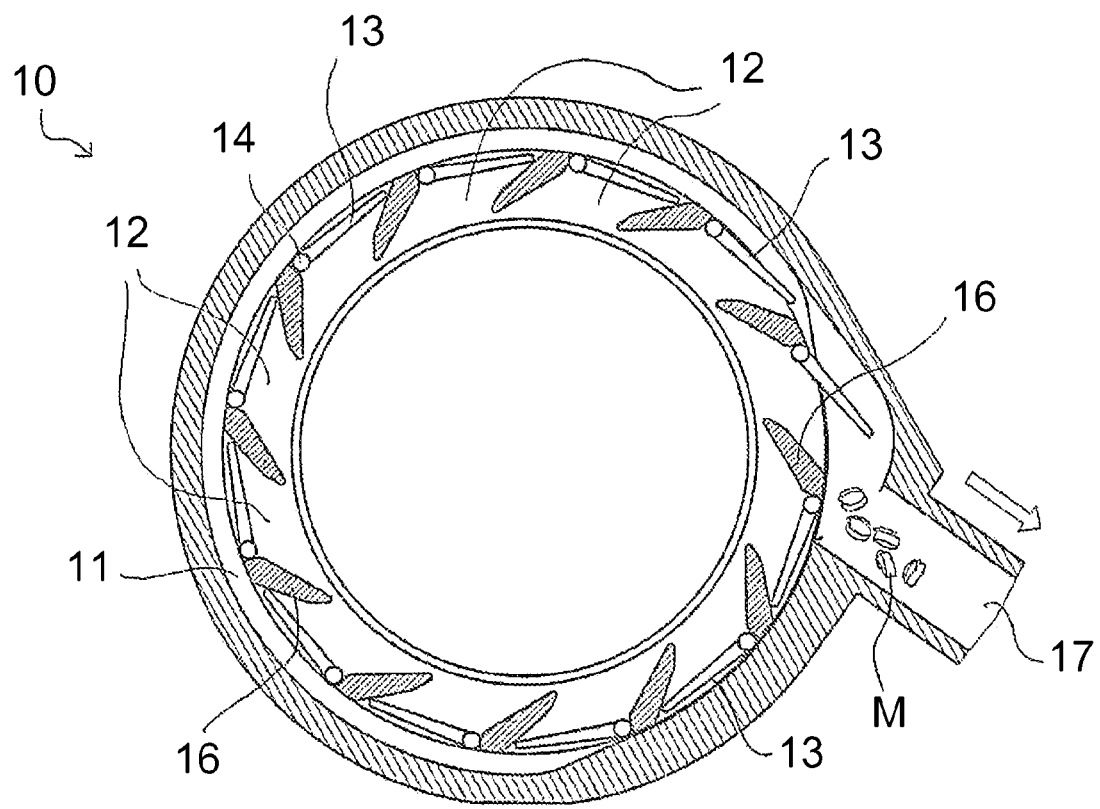

The rotating element 11 (cylinder) can have, for example as in FIGS. 5 and 6, a plurality of blades 22 arranged in front of the removal portions 12, with reference to the advancement direction of the bulk material (tablets). The blades 22 are arranged circumferentially around the axis of the rotating element 11, forming a crown of blades that operate on the bulk material. The blades 22 can be tilted with respect to the rotation axis of the element 11. The blades 22 are shaped and arranged in such a manner as to push back or facilitate the flow of the material, according to the rotation direction of the element 11. In particular, the blades 22 are tilted so as to push back at least partially the bulk material M to the inside of the first container 2 when the rotating element 11 rotates in a second rotation direction (opposite the first rotation direction and contrary to the rotation direction of the first container 2 around the first rotation axis X1). By considering the flow of the bulk material M that exits the first container 2, the material first meets the system of blades 22, that is suitable for obstructing or facilitating the flow of the material according to the rotation direction, then meets the system with the removal portions 12 (containing chambers), which has similar behaviour as each removal portion 12, by virtue of the shape thereof, does not retain the material when the element 11 rotates in a direction opposite the first container 2 and, vice versa, removes the material when the element 11 rotates in the same direction as the first container 2.

Each removal portion 12 can comprise, in particular, at least one removal opening of the bulk material M and at least one-discharge opening for the bulk material M. The removal opening can be arranged, as in this embodiment, with a prevalently axial orientation (facing the inside of the first container 2). The discharge opening can be arranged, as in this embodiment, with a prevalently radial (outwardly facing) orientation. The terms "axial" and "radial" must be understood to refer to the rotation axis X of the rotating element 11, or to the first rotation axis X1 of the first container 2.

The aforesaid wall 13 of the removal portion 12 can act as a blade, i.e. as a tool for removing the bulk material M, and can comprise a flat body, possibly curved or concave.

The aforesaid wall 13 (which is movable, in particular closable and openable) of the removal portion 12 can act, substantially, as a shutter member with the possibility of adopting a closed position in which it closes the discharge opening, when the removal portion 12 is in the lower level, and an open position in which the discharge opening opens, when the removal portion is at the upper level.

The coating apparatus 1 can comprise, in particular, an actuating arrangement, for example of the cam type, arranged to move the movable wall 13 (shutter) between the closed and open positions. The wall 13 can be movable between the closed and open positions by rotating around a fulcrum 14. In particular, the movement of the movable wall 13 can be guided by a cam element including a fixed cam profile engaged with a pin that is slidable and integral with the movable wall 13. During the rotation of the rotating element 11, the coupling between the pin and the cam profile causes the opening movement (rotation around the fulcrum 14) of the movable wall 13 in the discharge zone of the bulk material M at the aforesaid upper position and the closing movement of the wall 13 once the bulk material M has been discharged. The cam profile can be engaged with a plurality of pins, one for each removal portion 12.

Each removal portion 12 can comprise a side with a (fixed) wall 16 tilted in such a manner that, when the movable wall 13 opens (at the upper position in the release zone), the exit of the bulk material M from the removal portion 12 is promoted by the force of gravity. The exit of the bulk material M from the removal portion 12, when the movable wall 13 opens, can be promoted by a centrifugal force due to the rotation of the rotating element 11 and/or by an aerodynamic force due to the movement of air generated by the opening of the movable wall 13. The (fixed) wall 16 bounds the containing chamber of the bulk material M.

The conveying device can comprise, in particular, at least one chute 17 arranged to convey the bulk material M coming from the conveyor 10 to the second container 6 (in particular through the supply portion 15 arranged on the second inlet 7). The chute 17 can be arranged to receive the bulk material M discharged from the various removal portions 12 when the latter reach the release zone of the material at the aforesaid upper position.

The coating apparatus 1 comprises a motor device 18 for driving the conveyor 10, in particular for rotating the rotating element 11. The coating apparatus 1 can further comprise a first motor device 19 for rotating the first container 2 and a second motor device 20 for rotating the second container 6. The motor device 18 of the conveyor 10 can be distinct from and be adjustable independently of the first motor device 19 and of the second motor device 20. The first motor device 19 can be distinct from and adjustable independently of the second motor device 20.

The first container 2 can comprise, as in this embodiment, a series of tilted ridges 21 (in other embodiments the ridges could also not be tilted) that protrude radially inside from the inner surface of the first container 2 (in particular arranged near the first outlet 4) and that act as deflectors or blades for moving the bulk material M.

The operation of the apparatus 1 is disclosed below.

In this specific embodiment, the coating apparatus 1 works continuously, so that there is a stationary work step in which the bulk material M moves without interruptions from a loading zone where the bulk material M enters the first container 2 (enters through the first inlet 3 first passing through the fixed supply portion A), to a final discharge zone where the bulk material M exits the second container 6 (exits through the second outlet 8 to then be discharged outside by passing through the fixed discharge portion D, or in other embodiments, passing through a conveyor that is similar to the conveyor 10). In the stationary production step the mass flow rate of the bulk material M that traverses the apparatus 1 is (approximately) constant, so that the flow rate of material that enters the supply portion A and thus the first container 2 is (approximately) the same as the flow rate that exits the second container 6 and thus the discharge portion D.

In stationary operation, the bulk material M (tablets) is introduced (in known manner) into the first container 2 through the first inlet 3. The first container 2 rotates continuously at a desired rotation speed (controlled by a programmable electronic control device) around the first rotation axis X1 so as to handle (convey and mix) the bulk material M, whereas the first dispensing device 5 sprays the coating material onto the bulk material M. The continuous rotation of the first container 2 promotes the transit of the bulk material M to the first outlet 4 of the first container 2. A flow of process gas (treated air) is forced from the outside to the inside and then from the inside to the outside, passing through the holes and the mass of the tablets, both for the first container 2 and for the second container 6.

In the stationary phase, the rotating element 11 rotates in a given rotation direction around the rotation axis X, in particular in a rotation direction in accordance with the rotation direction of the first container 2, at a continuous rotation speed (regulated by the programmable electronic control device) that can be different from (for example less than) the (continuous) rotation speed of the first container 2, set at a value that is such as to maintain correctly the stationary condition, on the basis of the flow rate of the bulk material M, during the dwell time of the bulk material M in the first container 2, at the flow rate of the coating material, and at the other (known) process parameters.

During the rotation of the rotating element 11, every single removal portion 12 collects (with the movable wall 13 in closed position), at each revolution of the rotating element 11, a certain quantity of bulk material M, exiting the first container 2 at the lower position (in the removal zone), retains the bulk material M by lifting the bulk material M as far as the upper position, where the movable wall 13 receives the opening command (owing to the cam element) to enable the bulk material M (in the release zone) to be discharged. The bulk material M is discharged towards the chute 17 by a combined effect of centrifugal force, force of gravity and aerodynamic force.

In FIGS. 7 to 10 four moments are illustrated in sequence of the lifting step of the bulk material M starting from the removal zone (lower position) until the release zone (upper position).

After which the bulk material M, which has been discharged from the removal portion 12 in the release zone, slides on the chute 17 until it enters the second container 6 (through the supply portion 15 and the second inlet 7), then transits in the second container 6 where it can be further processed (for example sprayed with coating material by the second dispensing device 9), in order to then exit the second container 6 (through the second outlet 8) and lastly be discharged outside through the discharge portion D.

There are also two transitional work steps, a start or filling step, starting from a state in which the containers 2 and 6 are empty until the stationary production state, and to the switch-off or emptying step, in which the opposite occurs.

In the initial transition phase, the rotating element 11 can rotate around the rotation axis X in a rotation direction that is opposite the rotation direction of the stationary phase, in particular a rotation direction that is opposite the rotation direction of the first container 2 around the first rotation axis X1, so as to obstruct the exit of the bulk material M and promote (accelerate) reaching a desired level of material inside the first container 2. Whilst the level of the bulk material M increases in the first container 2, the rotation speed of the rotating element 11 can be regulated (by the programmable electronic control device) so as to move the material in the desired manner. It is possible to regulate the rotation of the rotating element 11 by passing gradually from a rotation direction (opposite the first container 2) to the opposite rotation direction (in the same direction as the first container 2), checking the first container 2 so that it always rotates in the same direction. Once the desired conditions have been achieved (for example the desired quantity of bulk material M in the first container 2), the stationary phase can start. During this initial start transition phase, the conveyor 10 promotes filling of the first container 2, obstructing and/or stopping the transfer downstream of the bulk material M, in particular owing to the reverse rotation of the rotating element 11.

The rotating transfer element 11 can be provided, as in this embodiment, with a plurality of tilted blades 22 for promoting the transfer of the bulk material M when the rotating element 11 rotates in a direction (in the same direction as the rotation of the first container 2) and for pushing back the bulk material M when the rotating element 11 rotates in the opposite direction (in the opposite direction to the rotation of the first container 2).

In the final transition phase, the rotating element 11 can rotate with a rotation direction in the same direction as the rotation direction of the first container 2 and at a rotation speed that is greater than or the same as that that it had in the stationary phase, so as to facilitate/accelerate emptying of the first container 2, but without damaging the bulk material M.

The ratio of the rotation speeds of the rotating element 11 and of the first container 2 can be variable, changing from the initial transition phase to the stationary phase and thus change from the stationary phase to the final transition phase, and can be programmed in the electronic control device of the coating apparatus 1.

The coating apparatus 1 permits a very delicate transfer of the bulk material (pharmaceutical tablets or other items) from one rotating container to the next one, preserving the bulk material that has just been processed (coated) with significant efficacy.

The bulk material is transferred by making it perform a movement that at least in partially comprises a lifting or raising of position, from the outlet of a rotating container and before reaching the next rotating container. This lifting, enables, amongst other things, the two rotating containers to be arranged at two positions that are not very different from one another (or are even at the same position), thus limiting the vertical dimension of the apparatus overall. It is possible, in other embodiments that are not illustrated that the second rotating container (downstream) is arranged higher, at a position that is higher than the first rotating container (upstream).

The inlet of the material to be processed into the apparatus (fixed supply portion A and first inlet 3 of the first rotating container 2) and the outlet of the processed material from the apparatus (second outlet 8 of the second rotating container 6 and fixed discharge portion D) are arranged on the (front) side of the apparatus, with consequent ease and practicality in the control of the apparatus by an operator, although in other embodiments the inlet of the material to be processed and the outlet of the processed material can be arranged on different sides of the apparatus.

Further, in this specific embodiment, the position (in a vertical elevation) of the inlet of the material to be processed and the position of the outlet of the processed material have a relatively reduced difference; in other embodiments (which are not illustrated) the difference in level between the inlet and outlet could be even more reduced. This minimum difference in level enables the facility and practicality of the control for an operator to be further improved.

The coating apparatus 1 disclosed above is designed for continuous production, but it is also possible to provide coating apparatuses that are suitable for discontinuous ("batch" mode) production. In an apparatus that is suitable for working in "batch" mode, for each rotating container a work cycle will be provided that comprises a bulk material loading step in which the rotating container is filled with the desired quantity of material, a work step in which the aforesaid quantity of material is coated with the coating material remaining inside the container, and a discharge step in which the rotating container is emptied completely.

Also in "batch" mode, a conveyor or lifter can be arranged between the first container and the second container in such a manner as to maintain or raise the position of the bulk material that exits the first container, during the step of transferring the material from the first to the second rotating container.

It has been seen that the apparatus in question enables the bulk material to be removed, retained and raised in position that exits a rotating container before introducing the material into the next rotating container. This enables an apparatus to be made that comprises several serially arranged rotating containers and has significant operating versatility and flexibility, relatively compact dimensions and great ergonomics. These features can be improved further by arranging, as said, another conveyor, similar to the conveyor 10, also at the second outlet 8 (outlet of the second container 6).

The aforesaid conveyor or lifter that raises the position of the material can be useful during the start step of the apparatus, in which the apparatus is empty and starts to receive the flow of material to be coated, to stop or temporarily slow this flow of materials so as to form a minimum layer of material, a necessary condition for the start of the coating step (spraying of the coating material). This can be achieved, as seen, by moving the conveyor or lifter in a direction opposite the movement direction that will be used in the stationary phase.

The coating apparatus can be constructed in a modular manner, by combining appropriately the number and/or the arrangement of the rotating containers and of the conveying device that transfer the bulk material from one container to the other, easily adapting the apparatus to different productive needs.

In the embodiment disclosed here, the coating apparatus 1 comprises two rotating containers (first and second containers 2 and 6) arranged serially one after the other. It is possible, in other embodiments which are not illustrated, to provide apparatuses comprising a different number (three, four or more) of rotating containers arranged serially one after the other. The bulk material M can be conveyed from the second container 6 to a third rotating container, lifting the bulk material exiting the second container 6 from a lower position to an upper position so that the bulk material M reaches the third container; the same can occur from a third to a fourth container, and so on.

The possibility of arranging several containers serially to process the bulk material enables a modular apparatus to be created that has great flexibility and versatility that is adaptable to varying of the process parameters, such as for example the flow rate of the bulk material to be processed, the dwell time of the bulk material in the apparatus, the type of bulk material to be coated or of coating material, etc.

Figure 14:
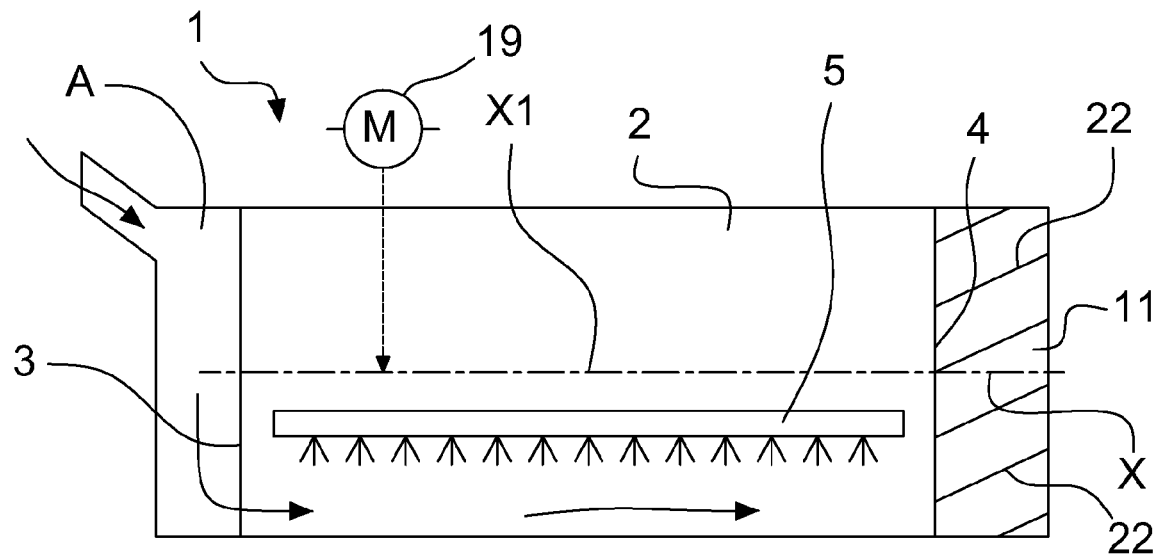
FIG. 14 is a side view of a diagram of another embodiment of a coating apparatus made according to the invention.
Figure 15:
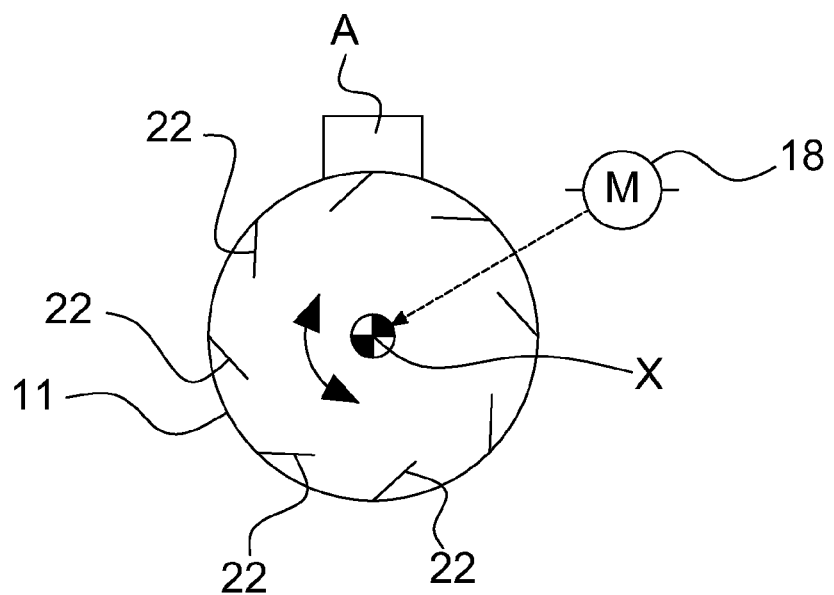
FIG. 15 is a view from the right of FIG. 14.
Figure 16:
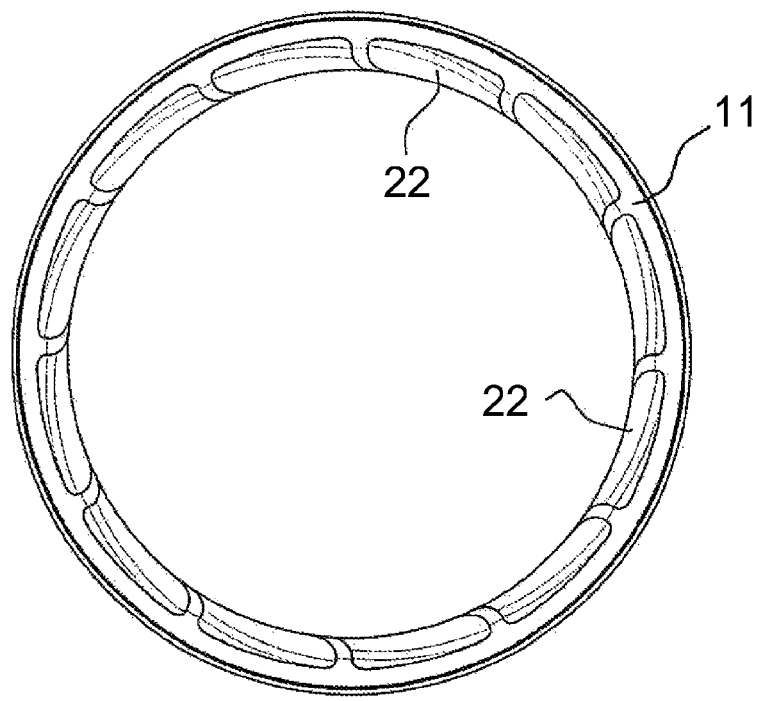
FIG. 16 is a side view of an annular regulating element that is usable in the apparatus of FIG. 14.
Figure 17:
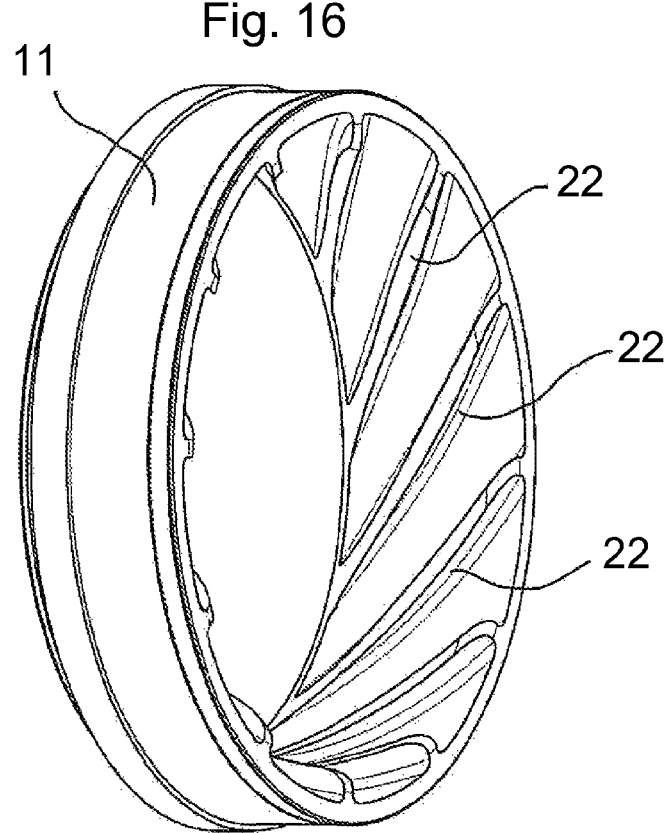
FIG. 17 is a perspective view of the element of FIG. 16.

In the coating apparatus shown in FIG. 14, the rotating element 11 is a regulating element arranged at the or near the second outlet end 4 to regulate the exit of the bulk material M from the container 2. In this embodiment, the regulating element comprises a rotating (cylindrical) annular element 11 provided with a driving arrangement (the motor device 18) configured for rotating the annular rotating element 11 selectively in a first rotation direction and in a second rotation direction opposite the first. Such driving arrangement is programmed, in particular, for an operating mode, in a stationary phase, in which the annular element 11 is driven to rotate (with several rotation revolutions) in the first rotation direction at the same time as the rotation of the container 2, to permit the exit of the bulk material M from the container 2. Further, this driving arrangement is programmed, in particular, for an operating mode, in an initial transitional filling step, in which the annular element 11 is driven to rotate (with several rotation revolutions) in the second rotation direction at the same time as the rotation of the container 2, to retain the bulk material M inside the container 2 and thus form a bed of bulk material M until a desired level of material is reached.

The aforesaid first rotation direction of the element 11 is the same direction as the rotation of the container 2, whereas the second rotation direction is in the opposite direction to the rotation of the container 2. The element 11 can have a rotation axis X that is parallel to the longitudinal axis X1 around which the container 2 rotates. In particular, the annular element 11 is coaxial with the container 2. The annular element 11 comprises an inner surface that is shaped and arranged continuously with an inner surface of the container 2. The annular element 11 extends axially in length for a portion along the direction of the longitudinal rotation axis X1 of the container 2.

The aforesaid driving arrangement (the motor device 18) can be programmed for another operating mode, in a final emptying transition phase, in which the annular element 11 is driven to rotate (with several rotation revolutions) in the first rotation direction (in the same direction as the container 2) during the rotation of the container 2, at a rotation speed that is greater than or the same as the aforesaid stationary phase, to facilitate evacuation of the material.

The inner surface of the element 11 has a plurality of portions (the blades 22) protruding inwardly and arranged to move the bulk material M. Such protruding portions extend in length and are arranged tilted with respect to the rotation axis X of the annular element 11. The tilt of the protruding portions (blades 22) is such as to promote the exit of the bulk material M from the container 2 when the annular element 11 rotates in the first rotation direction (stationary phase or final emptying transition phase) and such as to promote the retaining of the bulk material M inside the container 2 when the annular element 11 rotates in the second rotation direction (initial filling transition phase). The protruding portions, as said, are made in the shape of blades (for example helix-shaped).

With reference to FIGS. 18 to 28, the operation of a coating apparatus 101 is disclosed having two rotatable tubular containers or drums, respectively 102 and 106. The bulk material to be coated feeds the first drum 102, for example by means of a doser of known type and which is not shown, whilst the coated bulk material exits the second drum 106. The first drum 102 and the second drum 106 are connected together by a conveyor, which for the sake of simplicity is not shown, such as, for example, a conveyor belt or a chute, such that the bulk material exiting the first drum 102 is conveyed to the inlet of the second drum 106.

The arrows indicate the process direction of the bulk material. The first drum 102 is provided at the outlet, upstream of the conveyor, with a regulating element 111, which is identical to the element 11 disclosed above in the preceding embodiments, which is rotatable so as to enable the flow of bulk material exiting the first drum 102 to be regulated and this flow to the second drum 106 to be blocked.

Figure 1:
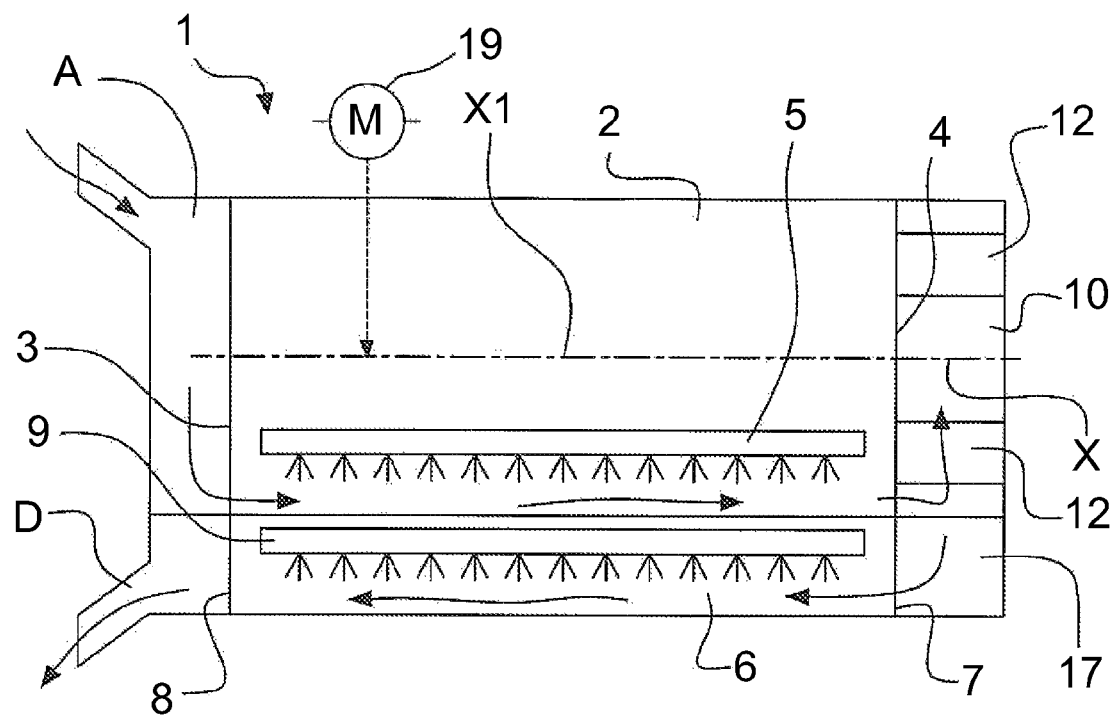
FIG. 1 is a side view of a diagram of a first embodiment of a coating apparatus made according to the invention.

For example, the coating apparatus 101 can be a coating apparatus like that of FIG. 1 or like that of FIG. 14, in this latter case it being provided that the outlet of the element 11 is connected to the inlet of a further drum—for example the second drum 106—through a conveyor that is of known type and is not illustrated. The elements of the apparatus 101 structurally or functionally corresponding to those of the other embodiments, disclosed above, have numeric differences that differ by "100".

Each drum 102, 106, is provided inside with a dispensing device 105, 109, each comprising a plurality of nozzles aligned and arranged in succession along the longitudinal extent of the respective drum 102, 106 to spray the coating material onto a respective spraying zone of the bulk material M contained in the drum 102, 106. The programmable electronic control device with which the coating apparatus 101 is provided enables the spraying zones to be controlled individually and the nozzles to be driven selectively according to different modes or sequences.

Figure 18:
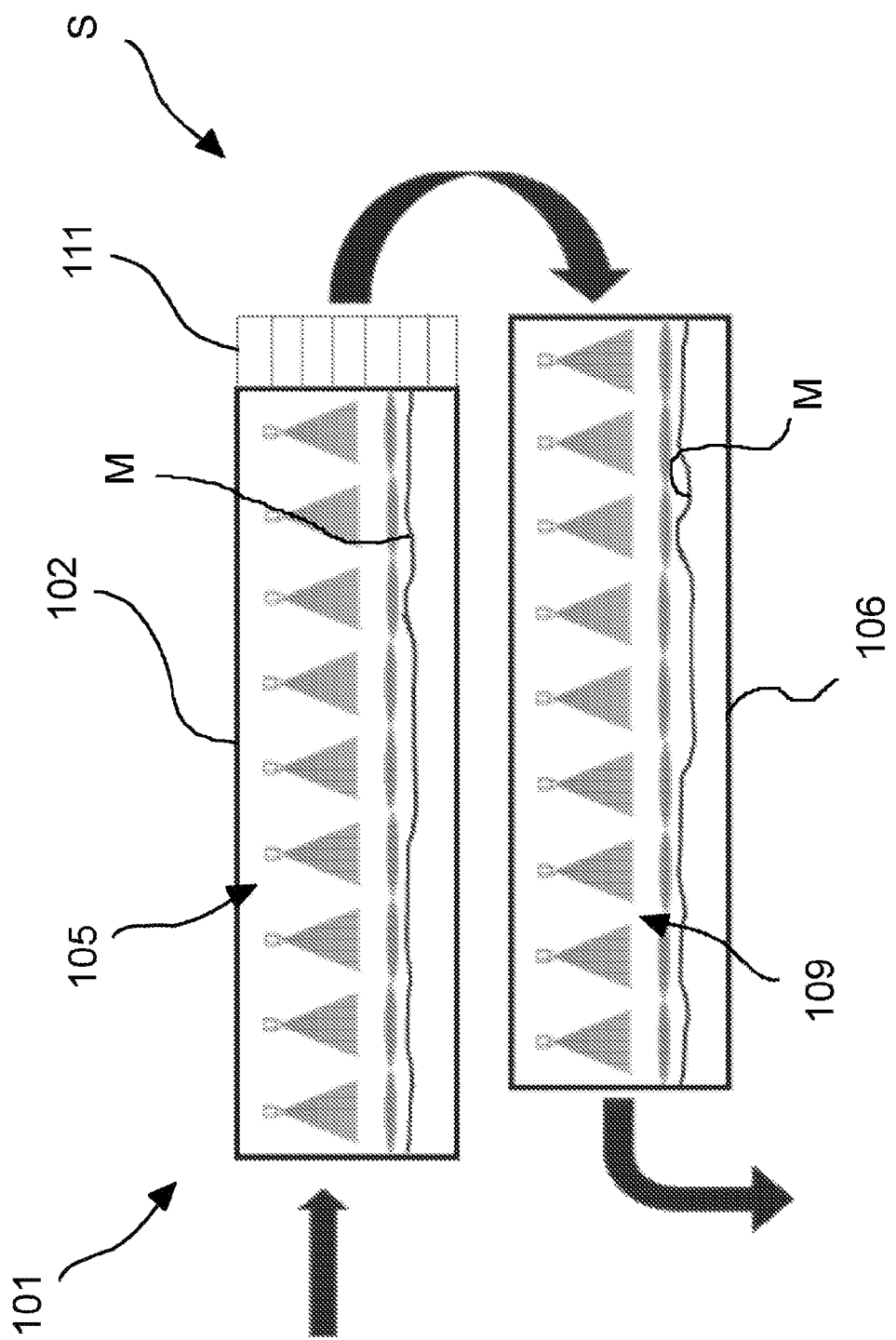
FIG. 18 is a schematic longitudinal section of a coating apparatus with two drums during a stationary phase of continuous operation.
Figure 19:
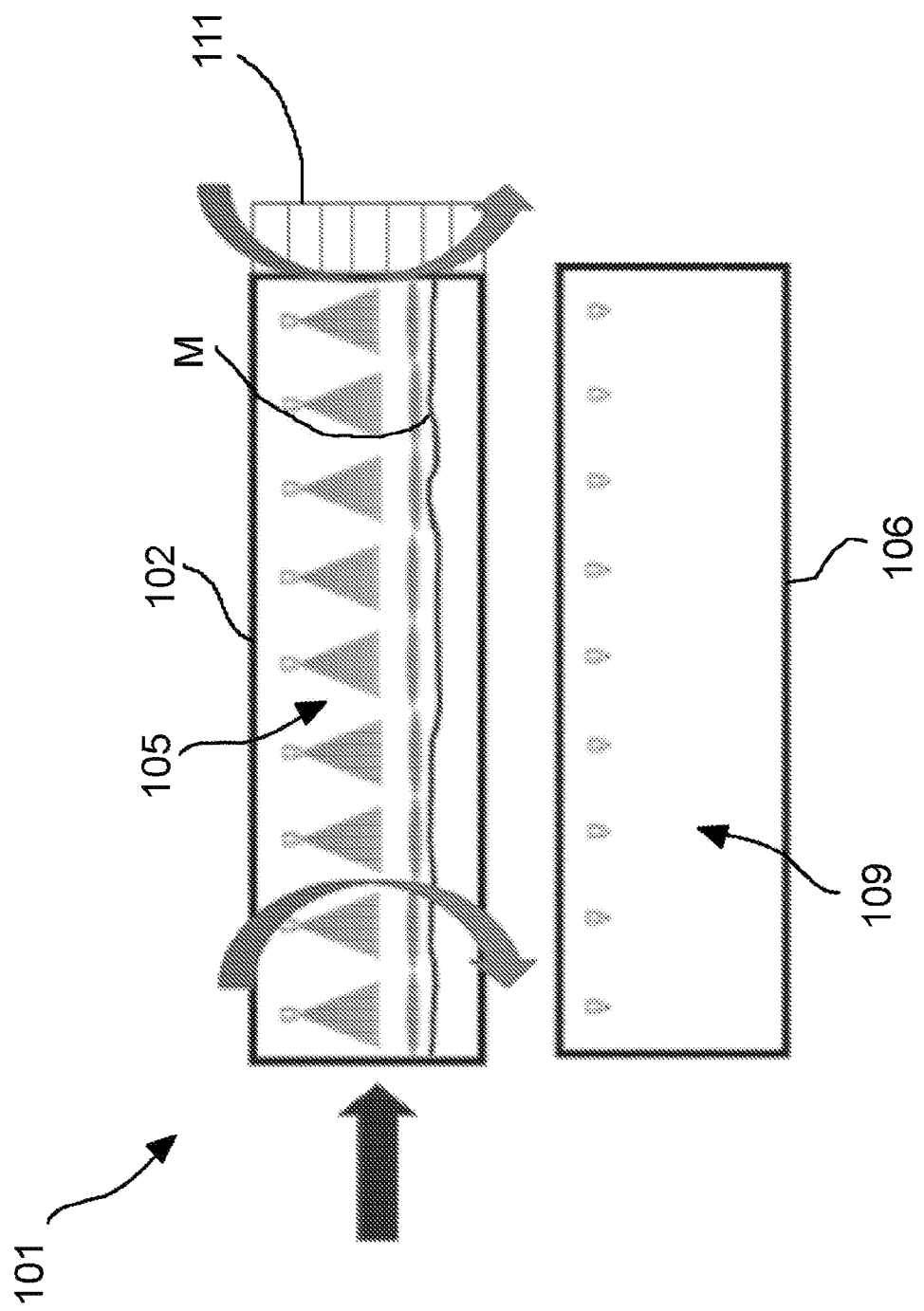
FIGS. 19 to 25 are sections like that of FIG. 18 during a start-up step of the coating apparatus.
Figure 20:
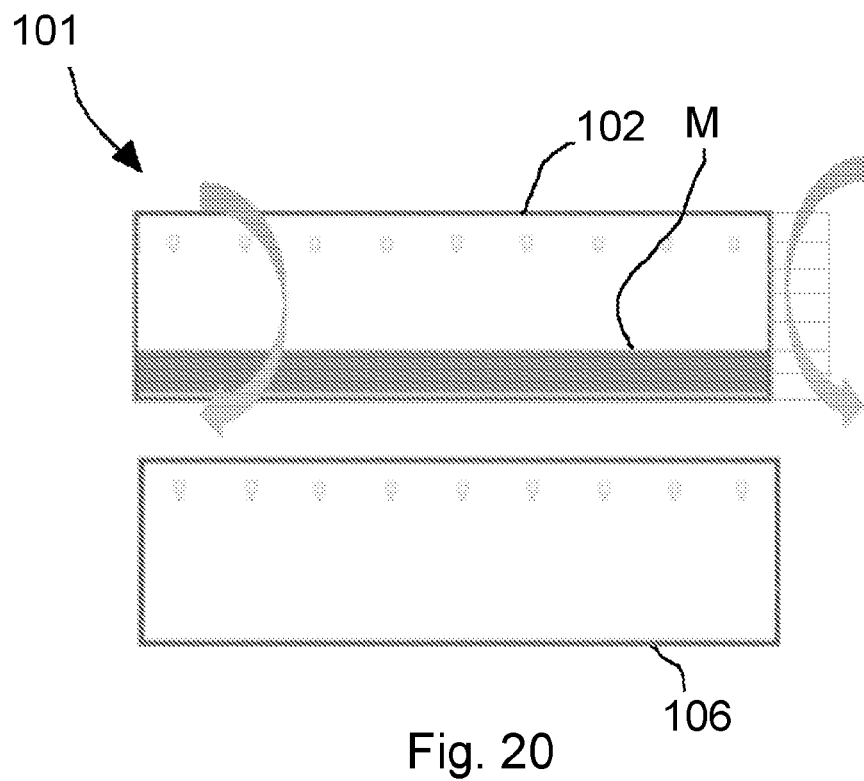

FIG. 18 shows the coating apparatus 101 during a step or mode of stationary operation S, in which the coating apparatus 101 is fed with bulk material to be coated continuously and produces coated bulk material with a certain preset coating weight gain. The flow of bulk material is regulated by the doser upstream of the coating apparatus 101, by the rotation speeds of the first drum 102 and of the second drum 106, by the rotation speed of the regulating element 111. In this operating condition S, all the nozzles of the first dispensing device 105 and all the nozzles of the second dispensing device 109 are activated and in the first drum 102 the bulk material reaches a weight gain equal to U %, whereas after traversing the second drum 106, the bulk material reaches a weight gain equal to a preset value W %, known below as the stationary or total weight gain. Each "nth" nozzle provides its own contribution $\Delta u_i\%$ to the weight gain achieved overall in a drum, so that considering "n" to be the number of nozzles in a drum, the total weight gain reached by the bulk material in the corresponding drum is the sum of all the partial weight increases supplied by each nozzle:

$$\sum_{i=1}^{n} \Delta u_i\% = U\%.$$

The coating apparatus 101 can be so structured and/or regulated that in stationary conditions in the first drum 102 the bulk material receives half of the expected coating, i.e. U % is the same as half the stationary weight gain or total weight gain W %. In other words, in this embodiment, each drum 102, 106 permits a weight gain equal to U %.

FIGS. 19-25 show start or filling step or procedure of the coating apparatus 101.

The start phase occurs on a discrete load ("batch") of the bulk material. Initially, the first drum 102 rotates in one direction, for example clockwise, whilst the regulating element 111 rotates in a direction opposite the first drum 102, i.e. anticlockwise in the embodiment, whilst the second drum 106 is still stationary. In this manner, the first drum 102 cannot discharge bulk material.

The doser is driven to deliver a load of preset bulk, when the load is achieved, the doser stops.

If the coating process requires a preliminary step of preheating the bulk material, the step starts on the load of bulk material delivered to the first drum 102 and lasts for a set time; when the temperature of the desired read M is reached, all the nozzles of the first dispensing device 105 are activated simultaneously. If the preheating is not necessary, all the nozzles of the first dispensing device 105 are activated after a set time has elapsed from the stop of the doser or at the same time as the stop of the doser. The nozzles of the first drum 102 spray coating material until a set weight gain of the bulk material inside the first drum 102 is reached. The set weight gain in this step of the start procedure is equal to the stationary weight gain or total W %.

Once the expected weight gain W % inside the first drum 102 is reached, all the spray nozzles of the first dispensing device 105 are deactivated simultaneously. During dispensing of the coating material in the first drum 102 and if the coating process requires it, it is possible to start to heat the second drum 106 (FIG. 20) until a desired process temperature for the second drum 106 is reached.

Figure 21:
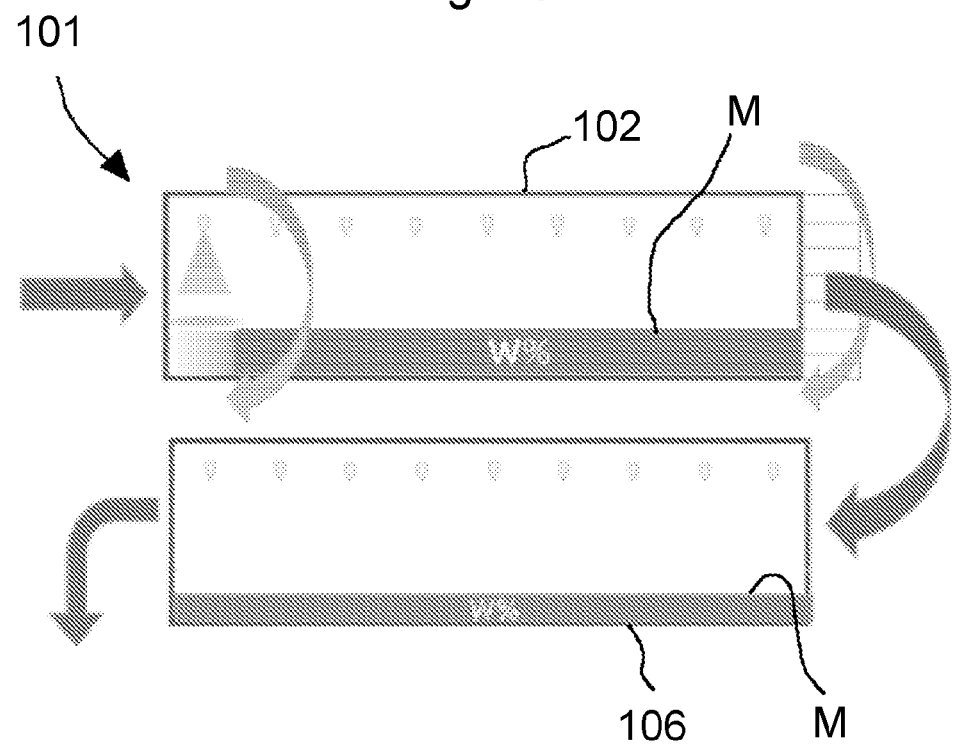
Figure 22:
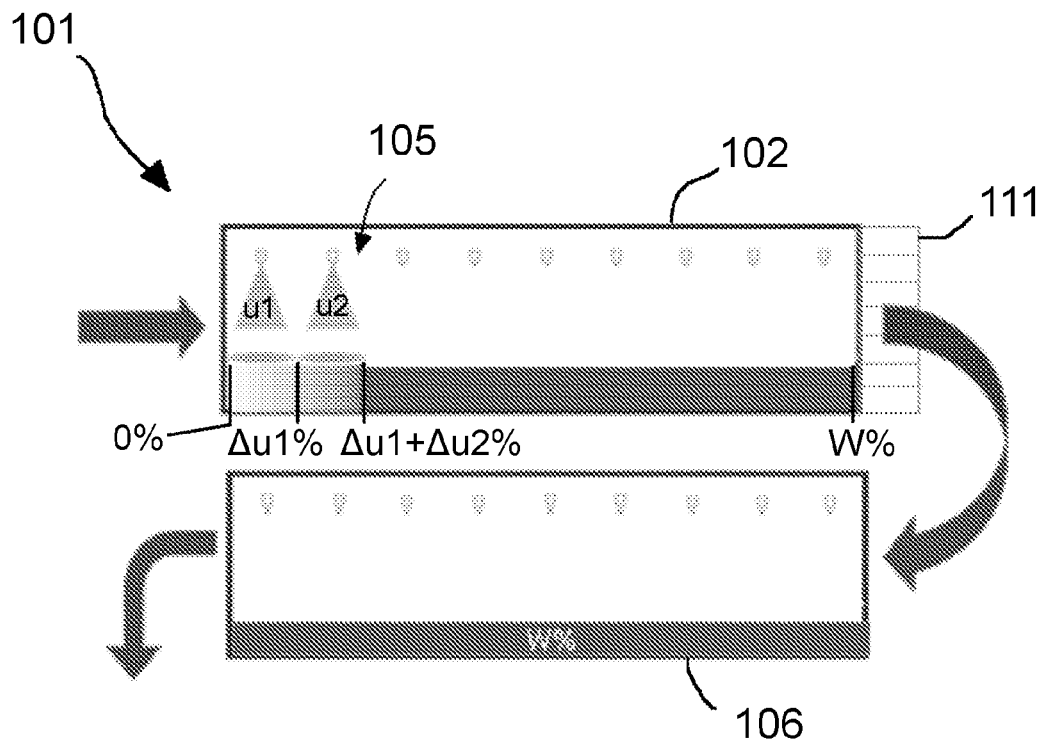

At this point, at the same time as the heating of the second drum 106—if heating of the second drum 106 is provided, the regulating element 111 is activated to rotate in a clockwise direction, i.e. in such a manner that the bulk material is conveyed from the first drum 102 to the second drum 106, the doser of bulk material downstream of the inlet of the first drum 102 is activated to permit the flow of new bulk material to be coated entering the coating apparatus 101, and the second drum 106 is rotated in such a manner that it can fill and can further discharge the bulk material already coated in the first drum 102 by the stationary weight gain W %. This is thus a transition phase to the stationary mode. The flow rate of coated bulk material that is transferred from the first drum 102 to the second drum 106 is, or can be, the same as the flow rate of bulk material still to be coated with which the first drum 102 is fed. As soon as the new not yet coated bulk material enters the first drum 102, the nozzles of the first dispensing device 105 are activated sequentially from the one nearest the inlet of the first drum 102 to the one nearest the outlet of the first drum 102 according to set times (FIGS. 21, 22). After a set time, in which all the nozzles of the first dispensing device 105 are activated, the quantity of coating material transferred to the bulk material located near the outlet of the first drum 102 reaches the value U % set for the first drum 102.

Figure 23:
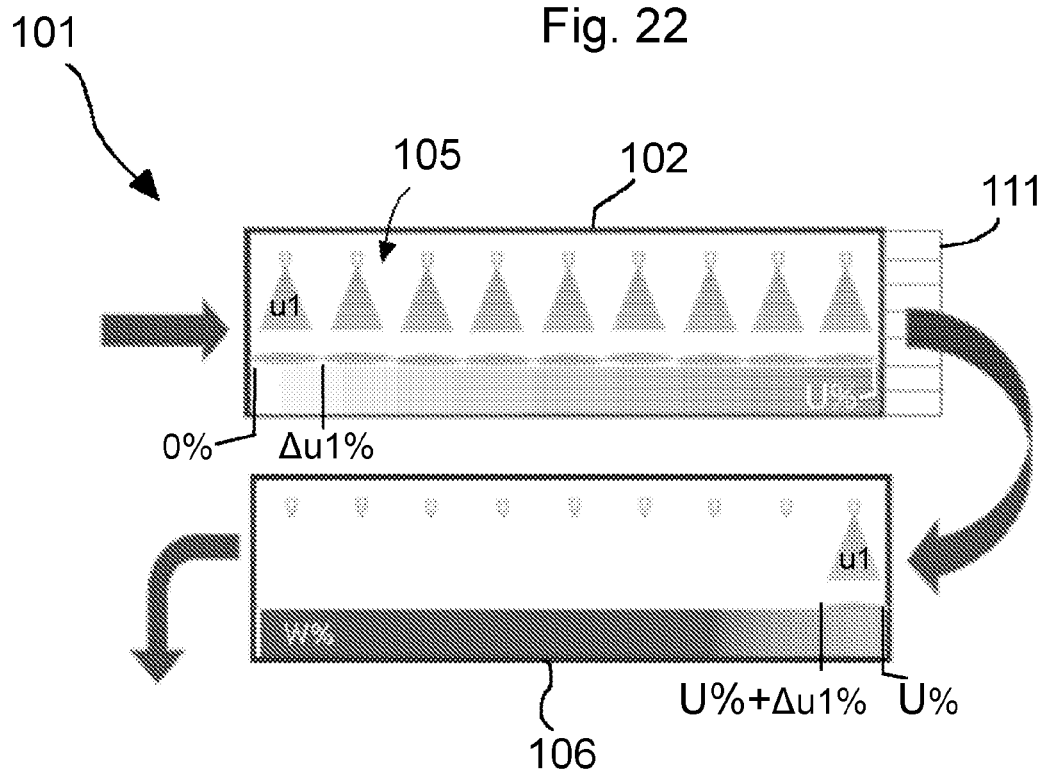
Figure 24:
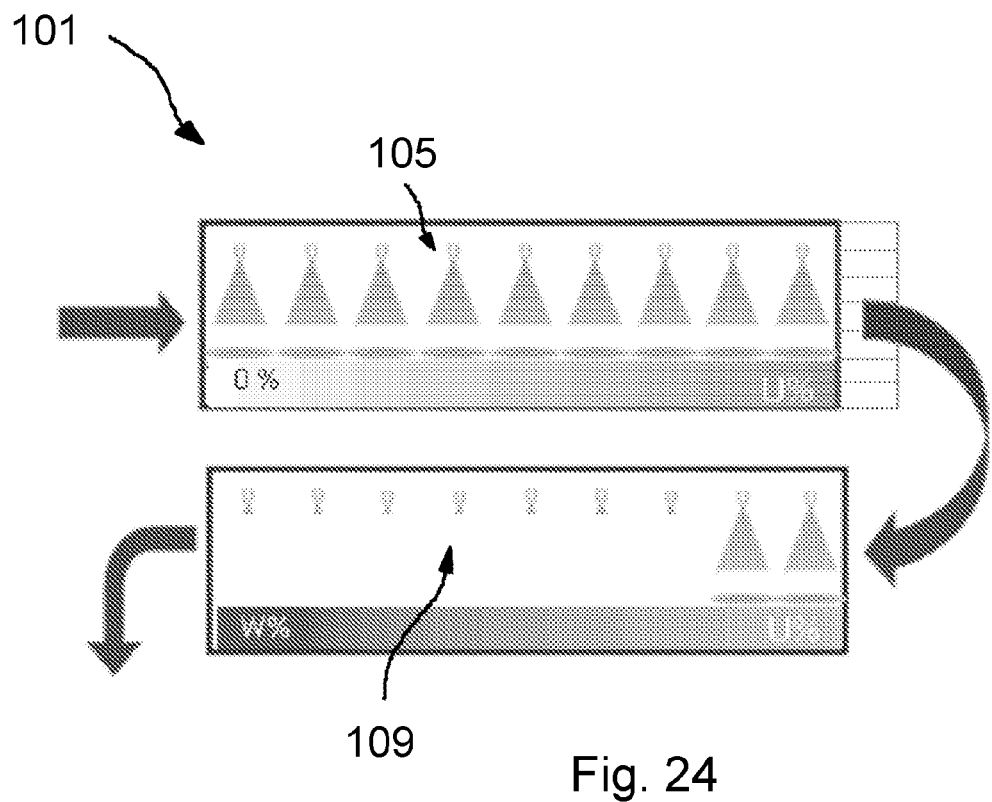
Figure 25:
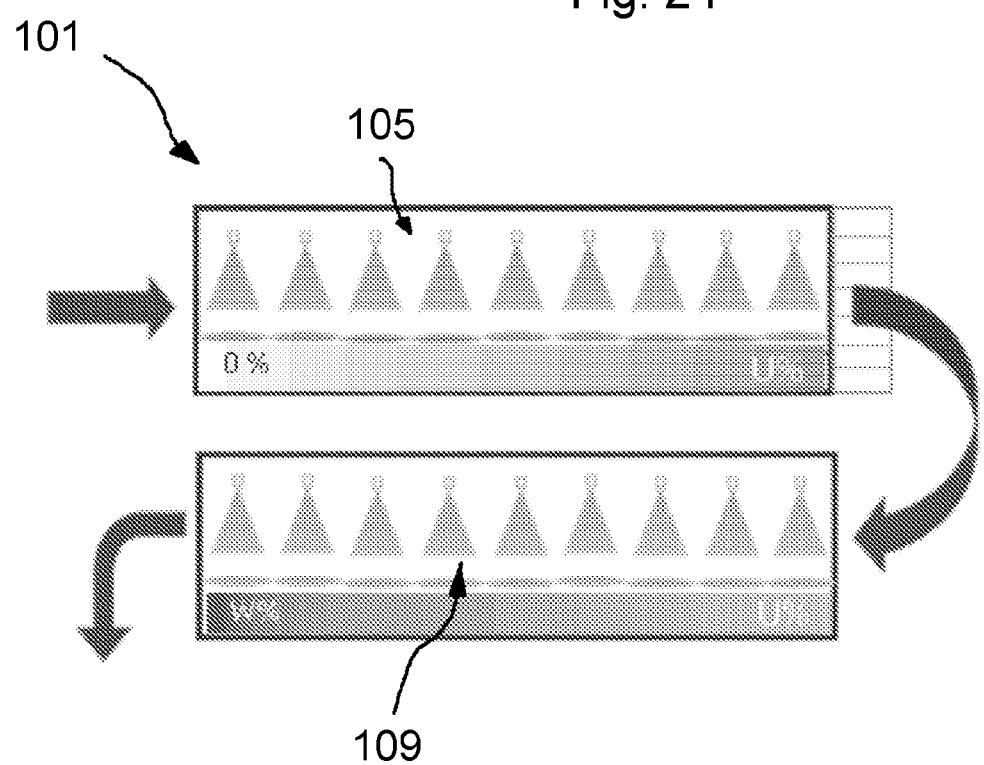

When the coated bulk material starts to enter the second drum 106 with a weight gain equal to U %—i.e. after a certain time after the last nozzle, nearest the outlet, of the first dispensing device 105 has been activated—sequential activation of the nozzles of the second dispensing device 109 starts in the second drum 106 at set intervals of time (FIGS. 23, 24).

Once all the nozzles, in both the drums 102, 106 are activated, the system can be considered to be started and balanced, the step of stationary operation (FIG. 25) being reached.

In this condition, the coating material is sprayed simultaneously in both the drums 102, 106, and the bulk material reaches the weight gain U % at the outlet of the first drum 102 and the bulk material reaches the stationary weight gain or total W % at the outlet of the second drum 10.

Figure 26:
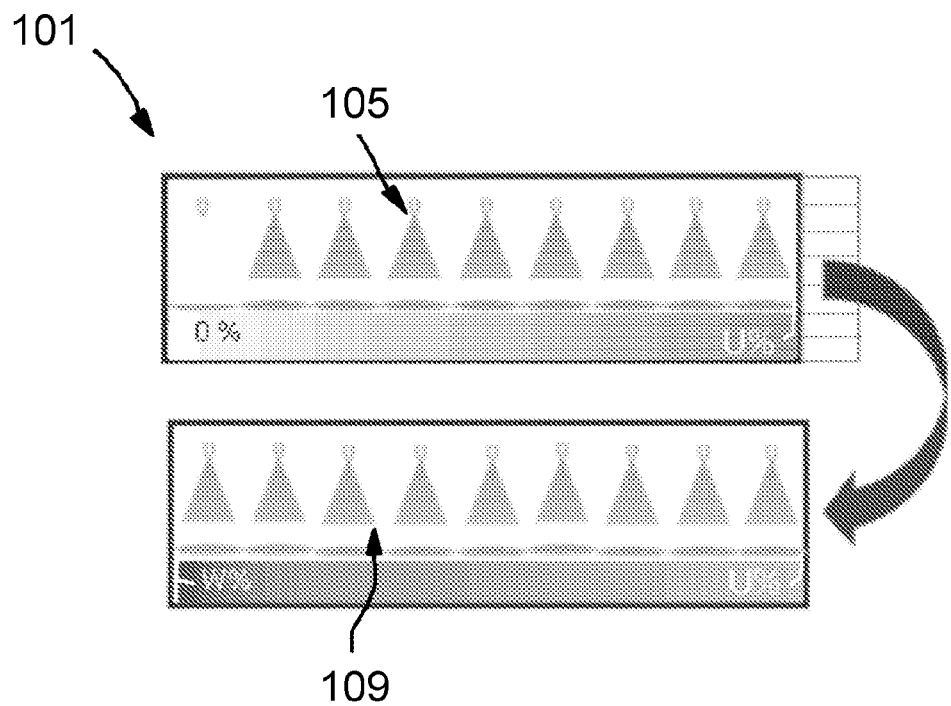
FIGS. 26 to 28 are sections like that of FIG. 18 illustrating the coating apparatus in a stop or emptying step.
Figure 27:
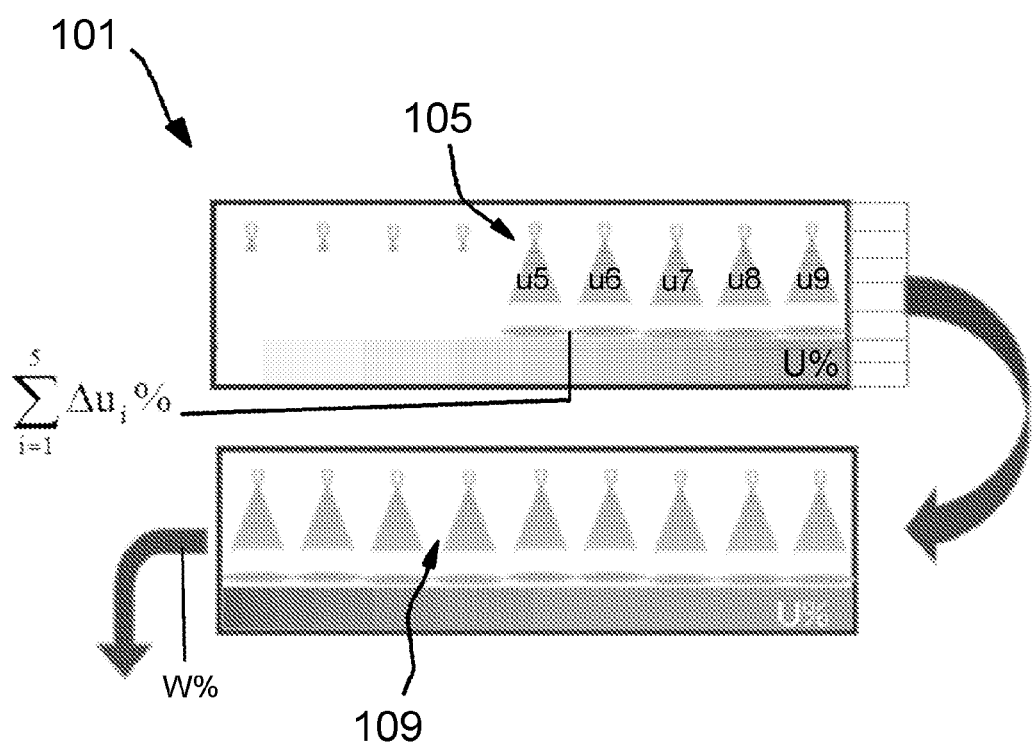
Figure 28:
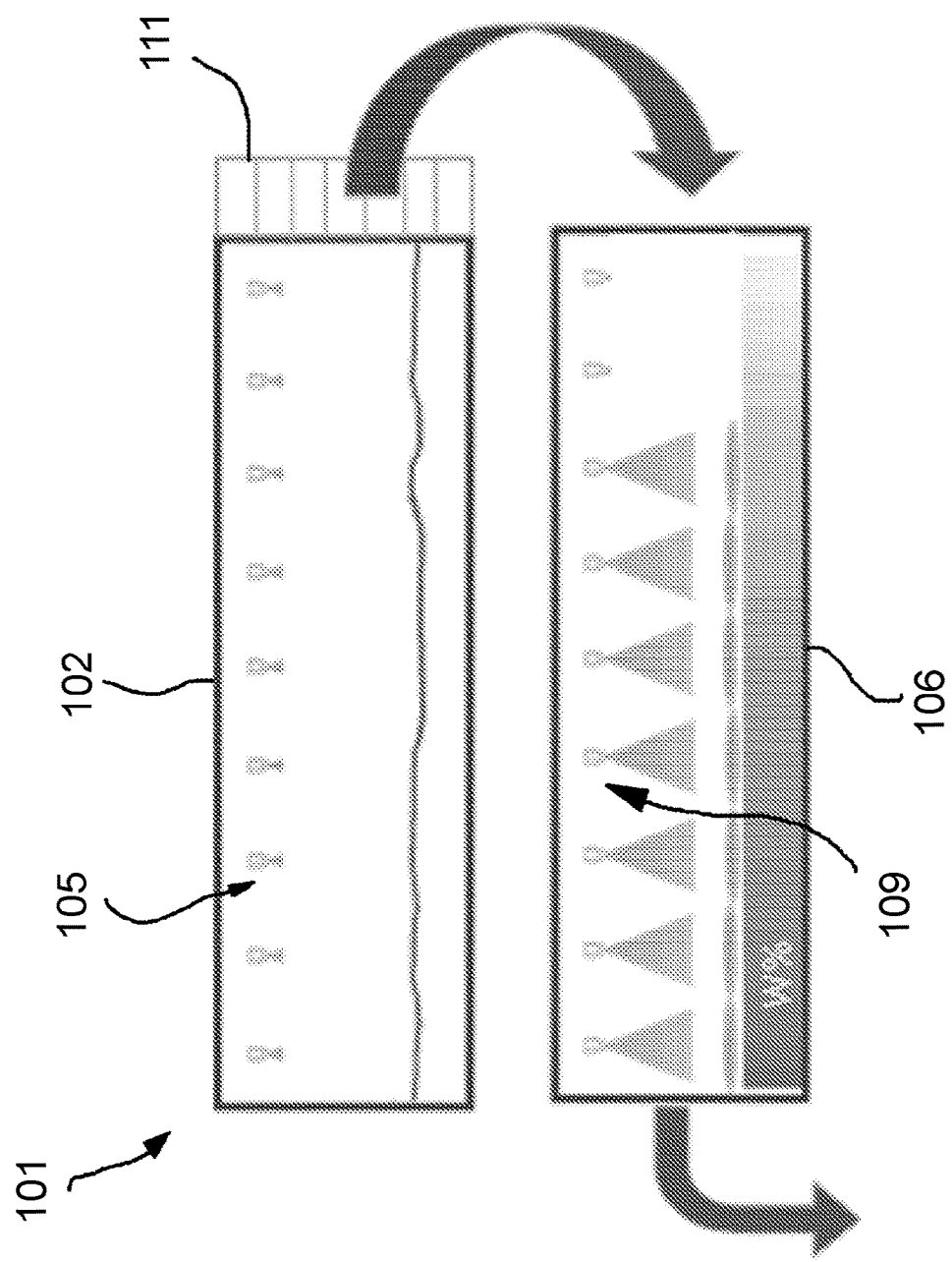

FIGS. 26-28 show a coating apparatus 101 stop or emptying step or procedure that is disclosed below.

The doser is stopped, so that bulk material to be coated is no longer introduced into the first drum 102. At the same instance in which the doser is stopped, the spray of the nozzles in the first drum 102 is stopped sequentially, from the nozzle nearest the inlet to the one nearest the exit at regular intervals of time.

The two drums 102 and 105 continue to rotate, also the regulating element rotates in the same direction as the first drum 102 (FIGS. 26 and 27). When all the tablets move from the first drum 102 to the second drum 106, i.e. after a set interval of time has elapsed from deactivation of the last nozzle in the first drum 102, also all the nozzles in the second drum 106 are deactivated sequentially, from the one nearest the inlet to the one nearest the outlet of the second drum 106. In this manner, substantially all the bulk material that traverses the coating apparatus 101 receives a weight gain that is the same as the stationary weight gain or total weight gain W %, without it being necessary to discard the head or the tail of bulk material produced respectively at the start or during the stop of the coating apparatus 101.

In a version of the coating process which can be carried out by the apparatuses described above, a stopping phase comprises the steps of:
  interrupting the delivery of material to be coated in the first rotatable tubular container 2, 102; and at the same time
  interrupting the transfer of the load of bulk material covered by the first rotatable tubular container 2, 102 to the second rotatable tubular container 6, 106;
  deactivating in sequence the spraying zones inside the second rotatable tubular container 6, 106 starting from the second outlet of the second rotatable tubular container 6, 106 towards the second inlet of the second rotatable tubular container 6, 106 and continuing to deactivate in sequence the zones of spraying inside the first rotatable tubular container 2, 102 starting from the first outlet of the first rotatable tubular container 2, 102 towards the first inlet of the first rotatable tubular container 6, 106, so as to obtain a loose material coated with the preset established stationary coating weight increase W % in both rotatable tubular containers.

Also in this embodiment, the loose material treated by the coating apparatus receives a weight increase equal to the stationary or total weight W %.

The invention claimed is:

1. A method for coating bulk material comprising:
  starting a coating apparatus according to a start procedure on a discrete load of bulk material to be coated;
  operating said coating apparatus in stationary mode by introducing a continuous flow of uncoated bulk material into said coating apparatus and obtaining at the outlet of said coating apparatus a continuous flow of coated bulk material having a predetermined stationary coating weight gain;
  wherein said coating apparatus comprises:
  a first rotatable tubular container arranged to receive and discharge bulk material, said first rotatable tubular container being provided with a first dispensing device for dispensing coating material on the bulk material in a plurality of internal successive adjacent spray zones between a first inlet and a first outlet of said first container;
  a second rotatable tubular container arranged to receive bulk material coming from said first container, said second rotatable tubular container being provided with a second dispensing device for dispensing coating material on the bulk material in a plurality of internal successive adjacent spray zones between a second inlet and a second outlet of said second container;
  a conveying device arranged to convey the bulk material from said first container to said second container;
  wherein said start procedure includes a step of simultaneously activating said plurality of spray zones inside said first container; and
  wherein said method further includes in succession the steps of:
  dispensing coating material on said load while maintaining said load internally of said first rotatable tubular container until coated bulk material having said predetermined stationary coating weight gain is obtained;
  a transition phase to said stationary mode in which there is provided transferring a flow rate of said load of coated bulk material from said first rotatable tubular container to said second rotatable tubular container and feeding said first rotatable tubular container with a same flow rate of bulk material to be coated;
  dispensing coating material on said same flow rate of bulk material to be coated entering said first rotatable tubular container by sequentially activating the spray zones inside said first rotatable tubular container to obtain at said first outlet a bulk material partially coated with a preset weight gain;
  dispensing coating material on said same flow rate of bulk material partially coated with said preset weight gain entering said second rotatable tubular container by sequentially activating the spray zones inside said second container to obtain a bulk material coated with said predetermined stationary coating weight gain.

2. The method according to claim 1, wherein said preset weight gain is the half of said predetermined stationary coating weight gain.

3. The method according to claim 1, wherein when said load is maintained internally of said first rotatable tubular container, said second rotatable tubular container is heated.

4. The method according to claim 1, wherein maintaining said load internally of said first rotatable tubular container comprises rotating a regulating element arranged at or near said first outlet in a direction of rotation opposite a rotation direction of said first rotatable tubular container.

5. The method according to claim 4, wherein during said transition phase said transferring occurs by rotating said regulating element in a direction according to said rotation direction of said first rotatable tubular container.

6. The method according to claim 1, wherein a shutdown procedure of said coating apparatus is provided during which there is provided stopping the feeding of said first rotatable tubular container and sequentially deactivating the spray zones inside said first rotatable tubular container.

7. The method according to claim 6, wherein in addition to said sequentially deactivating the spray zones inside said first rotatable tubular container there is further provided to interrupt sequentially the dispensing of said coating material in the spray areas inside said second rotatable tubular container.

8. The method according to claim 1, wherein after said step of simultaneously activating said plurality of spray zones inside said first container and before the transition phase to said stationary mode, there is provided a phase of deactivating at the same time said plurality of spray zones inside said first container.

9. The method according to claim 1, wherein said step of sequentially activating the spray zones inside said first container provides for the activation in succession of said spray zones starting from said first inlet of said first container towards said first outlet of said first container.

10. The method according to claim 1, wherein said step of sequentially activating the spray zones inside said second container provides for the activation in succession of said spray zones starting from said second inlet of said second container towards said second outlet of said second container.

11. The method according to claim 1 and further comprising a stopping phase including the steps of:
interrupting the delivery of material to be coated in said first rotatable tubular container;
and at the same time
interrupting the transfer of said load of covered bulk material from said first rotatable tubular container to said second rotatable tubular container;
deactivating in sequence the spray zones inside said second rotatable tubular container starting from said second outlet of said second rotatable tubular container towards said second inlet of said second container tubular rotatable and continuing to deactivate in sequence the spray zones inside said first rotatable tubular container starting from said first outlet of said first rotatable tubular container towards said first inlet of said first rotatable tubular container, so as to obtain a loose material coated with said predetermined stationary coating weight increase in both rotatable tubular containers.

12. A method for coating bulk material comprising:
starting a coating apparatus according to a start procedure on a discrete load of bulk material to be coated;
operating said coating apparatus in stationary mode by introducing a continuous flow of uncoated bulk material into said coating apparatus and obtaining at the outlet of said coating apparatus a continuous flow of coated bulk material having a predetermined stationary coating weight gain;
wherein said coating apparatus comprises:
a first rotatable tubular container arranged to receive and discharge bulk material, said first rotatable tubular container being provided with a first dispensing device for dispensing coating material on the bulk material in a plurality of internal successive adjacent spray zones between a first inlet and a first outlet of said first container;
a second rotatable tubular container arranged to receive bulk material coming from said first container, said second rotatable tubular container being provided with a second dispensing device for dispensing coating material on the bulk material in a plurality of internal successive adjacent spray zones between a second inlet and a second outlet of said second container;
a conveying device arranged to convey the bulk material from said first container to said second container;
wherein said method includes in succession the steps of:
dispensing coating material on said load while maintaining said load internally of said first rotatable tubular container until coated bulk material having said predetermined stationary coating weight gain is obtained;
a transition phase to said stationary mode in which there is provided transferring a flow rate of said load of coated bulk material from said first rotatable tubular container to said second rotatable tubular container and feeding said first rotatable tubular container with a same flow rate of bulk material to be coated;
dispensing coating material on said same flow rate of bulk material to be coated entering said first rotatable tubular container by sequentially activating the spray zones inside said first rotatable tubular container to obtain at said first outlet a bulk material partially coated with a preset weight gain;
dispensing coating material on said same flow rate of bulk material partially coated with said preset weight gain entering said second rotatable tubular container by sequentially activating the spray zones inside said second container to obtain a bulk material coated with said predetermined stationary coating weight gain; and
a stopping phase comprising the steps of:
interrupting the delivery of material to be coated in said first rotatable tubular container; and at the same time
interrupting the transfer of said load of covered bulk material from said first rotatable tubular container to said second rotatable tubular container;
deactivating in sequence the spray zones inside said second rotatable tubular container starting from said second outlet of said second rotatable tubular container towards said second inlet of said second container tubular rotatable and continuing to deactivate in sequence the spray zones inside said first rotatable tubular container starting from said first outlet of said first rotatable tubular container towards said first inlet of said first rotatable tubular container, so as to obtain a loose material coated with said predetermined stationary coating weight increase in both rotatable tubular containers.

* * * * *